United States Patent
Yang et al.

(10) Patent No.: US 11,252,134 B2
(45) Date of Patent: Feb. 15, 2022

(54) SYSTEM AND METHOD FOR MANAGING SECURE COMMUNICATIONS BETWEEN MODULES IN A CONTROLLER AREA NETWORK

(71) Applicant: Huawei International Pte. Ltd., Singapore (SG)

(72) Inventors: Yanjiang Yang, Singapore (SG); Zhuo Wei, Singapore (SG); Hsiao-Ying Lin, Singapore (SG); Qingdi Sha, Shenzhen (CN)

(73) Assignee: Huawei International Pte. Ltd., Singapore (SG)

( * ) Notice: Subject to any disclaimer, the term of this patent is extended or adjusted under 35 U.S.C. 154(b) by 211 days.

(21) Appl. No.: 16/748,568

(22) Filed: Jan. 21, 2020

(65) Prior Publication Data

US 2020/0162436 A1    May 21, 2020

Related U.S. Application Data

(63) Continuation of application No. PCT/SG2018/050355, filed on Jul. 18, 2018.

(30) Foreign Application Priority Data

Jul. 20, 2017   (SG) ................. 10201705960Q

(51) Int. Cl.
*G06F 21/00*         (2013.01)
*H04L 29/06*         (2006.01)
(Continued)

(52) U.S. Cl.
CPC ...... *H04L 63/0428* (2013.01); *G06F 16/2246* (2019.01); *H04L 9/0861* (2013.01);
(Continued)

(58) Field of Classification Search
CPC . G06F 16/2246; H04L 9/0861; H04L 9/3242; H04L 12/40; H04L 63/0428; H04L 63/064; H04L 63/123
See application file for complete search history.

(56) References Cited

U.S. PATENT DOCUMENTS 9,231,936 B1 *   1/2016   Wang ................ H04L 63/12
9,705,678 B1    7/2017   Wang
(Continued)

FOREIGN PATENT DOCUMENTS

CN   102340432 A   2/2012
CN   103385033 A   11/2013
(Continued)

OTHER PUBLICATIONS

Hou et al.,"Incremental Hash Tree for Disk Authentication," The IEEE symposium on Computers and Communications, pp. 213-215, Institute of Electrical and Electronics Engineers, New York, New York (2010).
(Continued)

*Primary Examiner* — Jeffrey C Pwu
*Assistant Examiner* — Thong P Truong
(74) *Attorney, Agent, or Firm* — Leydig, Voit & Mayer, Ltd.

(57) ABSTRACT

This document describes a system and method for managing communications between modules in a Controller Area Network (CAN) in a secure manner. In particular, the system employs a hierarchical key generation method that allows a module in the CAN to use a single ascendant key together with relevant identifiers to generate descendant keys for CAN identities in the Controller Area Network. These keys are then used by the broadcasting and receiving CAN modules to authenticate published messages.

26 Claims, 5 Drawing Sheets

(51) Int. Cl.
*G06F 16/22* (2019.01)
*H04L 9/08* (2006.01)
*H04L 9/32* (2006.01)
*H04L 12/40* (2006.01)

(52) U.S. Cl.
CPC .......... *H04L 9/3242* (2013.01); *H04L 12/40* (2013.01); *H04L 63/064* (2013.01); *H04L 63/123* (2013.01); *H04L 2012/40215* (2013.01); *H04L 2012/40273* (2013.01)

(56) References Cited

U.S. PATENT DOCUMENTS

| | | |
|---|---|---|
| 2004/0042401 A1 | 3/2004 | Itoi |
| 2008/0275895 A1 | 11/2008 | Leroux et al. |
| 2011/0093639 A1 | 4/2011 | Richards |
| 2012/0243683 A1 | 9/2012 | Oba et al. |
| 2016/0099939 A1 | 4/2016 | Jung et al. |
| 2016/0264071 A1 | 9/2016 | Ujiie et al. |
| 2016/0330032 A1 | 11/2016 | Naim et al. |
| 2017/0132533 A1* | 5/2017 | Darnell .................. G07C 5/008 |

FOREIGN PATENT DOCUMENTS

| | | |
|---|---|---|
| CN | 104025506 A | 9/2014 |
| CN | 104601329 A | 5/2015 |
| CN | 104767618 A | 7/2015 |
| CN | 105187376 A | 12/2015 |
| CN | 106453326 A | 2/2017 |
| CN | 106790053 A | 5/2017 |
| JP | 2017038143 A | 2/2017 |
| KR | 101740957 B1 | 5/2017 |

OTHER PUBLICATIONS

Tu Shan-Shan et al., "Group Key Management Based on Tree Structure in Ad Hoc Networks," vol. 36 No. 17, Computer Engineering, total 3 pages (Sep. 2010). With English abstract.

Yong Tian, "Research on Synchronization of Multiple Neural Networks," total 65 pages, Chongqing University (Apr. 2012). With English abstract.

Checkoway et al., "Comprehensive Experimental Analyses of Automotive Attack Surfaces," In Proceedings of USENIX Security 2011, total 16 pages (Aug. 2011).

Anthony Van Herrewege et al., "CANAuth—A Simple, Backward Compatible Broadcast Authentication Protocol for CAN bus," ECRYPT Workshop on Lightweight Cryptography, total 7 pages (Nov. 2011).

Groza et al., "LiBrA-CAN: A Lightweight Broadcast Authentication Protocol for Controller Area Networks," Proc. 11th International Conference, CANS 2012, total 16 pages (2012).

Hiroshi Ueda et al., "Security Authentication System for In-Vehicle Network," SEI Technical Review 2015, total 13 pages (2015).

Andreea-Ina Radu et al., "LeiA: A Lightweight Authentication Protocol for CAN," Proc. 21th European Symposium on Research in Computer Security, ESORICS 2016, total 18 pages (2016).

Nürnberger et al., "vatiCAN—Vetted, Authenticated CAN Bus," Proc. Conference on Cryptographic Hardware and Embedded Systems, CHES 2016, total 20 pages (2016).

Hazem et al., "LCAP—A Lightweight CAN Authentication Protocol for Securing In-Vehicle Networks," total 10 pages (2012).

* cited by examiner

SYSTEM AND METHOD FOR MANAGING SECURE COMMUNICATIONS BETWEEN MODULES IN A CONTROLLER AREA NETWORK

CROSS-REFERENCE TO RELATED APPLICATIONS

This application is a continuation of International Application No. PCT/SG2018/050355, filed on Jul. 18, 2018, which claims priority to Singapore Patent Application No. SG10201705960Q, filed on Jul. 20, 2017. The disclosures of the aforementioned applications are hereby incorporated by reference in their entireties.

FIELD OF THE DISCLOSURE

This disclosure relates to a system and method for managing communications between modules in a Controller Area Network (CAN) in a secure manner. In particular, the system employs a hierarchical key generation method that allows a module in the CAN to use a single ascendant key together with relevant identifiers to generate descendant keys for CAN identities in the CAN. These keys are then used by the broadcasting and receiving CAN modules to authenticate published messages.

SUMMARY OF THE PRIOR ART

Vehicles have become essential commodities in our daily life, offering commuters great comfort, convenience and self-autonomy. Modern vehicles are nowadays designed and built to be automated, safe, efficient, and environmentally friendly. In order to achieve this, modern vehicles typically comprise as many as 60 or more electronic control units (ECU) that each controls a particular subsystem of the vehicle. For example, these ECUs may comprise ECUs that control the engine subsystem, the transmission subsystem, airbag subsystem, cruise control subsystem, recharging subsystem, etc., whereby each ECU controls and receives feedback from a multitude of actuators or sensors in the vehicle. Regardless of the type of the ECU, these ECUs all typically need to communicate with each other to share information generated from the various sensors and/or to control the multitude of actuators.

The most widely used physical and single data link layer protocol in an in-vehicle communication network is the CAN standard which utilizes serial buses to link all the ECUs in the vehicle together. In the CAN standard, all the point-to-point wiring is replaced by a serial bus, and CAN-specific hardware is then added to each ECU so that the ECUs will be provided with the necessary protocols for publishing and subscribing frames on the CAN network. In general, the CAN network is an advanced serial bus system that efficiently supports distributed control systems. Typically, an in-vehicle network will comprise several CAN buses, whereby each bus is configured to perform a specific function or configured for specific capabilities. Within each CAN bus will be a plurality of ECUs that are communicatively connected through the CAN bus.

While the use of the CAN standard for inter-ECU communications in the vehicle greatly enhances and expands the functionalities of vehicles, it also renders vehicles vulnerable to cyber-attacks. Such attacks to an in-vehicle's communication network, such as the spoofing of the vehicle's CAN bus data message is particularly insidious as such attacks may result in the operator of the vehicle losing control of the vehicle.

Indeed, those skilled in the art have demonstrated the ease in which an attack may be carried out on an in-vehicle network. For example, it has been demonstrated that a vehicle's telematics system may be hacked and taken over remotely by malicious parties. This occurs because the CAN standard does not include broadcast source authentication means. Therefore, this allows malicious messages to be easily broadcasted on the CAN network by malicious attackers or compromised ECUs, and as a result, these messages are accepted by all other ECUs as if they were legitimate.

In order to address the issues mentioned above, those skilled in the art have proposed various authentication protocols that are compatible with the CAN bus standard. In a proposed method, a hash based message authentication protocol is utilized to authenticate messages that are published on the CAN bus. For this method, before the message is published, the broadcasting ECU will first derive a session key from a static pre-shared key. This session key is then used together with a counter value and a random number sent over an out-of-band CAN to authenticate messages published on the CAN.

The downside of this approach and other existing CAN authentication methods is that these methods leverage the use of unconventional cryptographic primitives such as Message Authentication Code (MAC) mixing. Further, the security of such unconventional uses of cryptographic primitives cannot be easily checked and/or these methods involve complex counter resynchronization algorithms. Still further, these methods also do not specify how counter synchronization may be executed to address the occurrence of message authentication failures. In addition to the above, in-vehicle communications are typically quite time sensitive. As a result, it is unlikely that ECUs will have sufficient time to negotiate a common session key before an ECU publishes or broadcasts a message on the CAN network.

For the above reasons, those skilled in the art are constantly striving to come up with a system and method for achieving secure message authentication in-vehicle communications that provides for source authentication, message integrity and prevention of replay attacks.

SUMMARY

Systems and methods for managing secure communications between modules in a CAN are proposed, and these systems and methods are set out below in accordance with embodiments of the disclosure.

A first improvement proposed by embodiments of systems and methods in accordance with the disclosure is that the number of authentication keys required to be maintained by a module in the CAN network is greatly reduced. Further, keys may be selectively issued to modules in the CAN network such that separation of duty is maintained between modules, depending on the functionality assigned to the module.

A second improvement proposed by embodiments of systems and methods in accordance with the disclosure is that internationally standardized cryptographic primitives are utilized for message authentication between modules in the CAN network. Further, the proposed inter-module message authentication includes freshness resynchronization mechanisms to address the possibility of authentication failures.

The above improvements are provided by embodiments in accordance with the disclosure operating in the following manner.

According to a first aspect of the disclosure, a system for managing secure communications between modules in a CAN is disclosed, the system comprising: a key management module configured to: organize CAN identities of the CAN into sub-sets based on functionalities of the CAN identities, wherein each sub-set is arranged as a tree structure having a root node which could represent a function of the sub-set; arrange the sub-sets of CAN identities into a tree structure having a root node $N_R$, wherein the root nodes of the sub-sets are arranged as descendant nodes of root node $N_R$; set a key for the root node $N_R$ and compute keys for each node in each level in the tree structure, starting from child nodes of the root node $N_R$, wherein a key of a child node in the tree structure is computed using a key of a parent node and an identifier identifying the child node. The system also includes a broadcast module communicatively connected to the key management module, configured to: generate a frame to be transmitted on the CAN whereby the frame is associated with a CAN identity $id_{c1}$ selected from the CAN identities; compute a CAN identity key $k_{c1}$ using an ascendant key $k_1$ associated with an ascendant node of the CAN identity $id_{c1}$ node and a root-node path identifier associated with the CAN identity $id_{c1}$ node wherein the ascendant key $k_1$ is retrieved from the key management module and the root-node path identifier comprises a value assigned to the CAN identity $id_{c1}$ node; obtain a scheme parameter p and compute a verification parameter $v_d$ based on the scheme parameter p, the key $k_{c1}$, the CAN identity $id_{c1}$ and the frame to be transmitted, wherein the scheme parameter p comprises a variable unique to the scheme; broadcast information comprising the frame associated with the CAN identity $id_{c1}$ and the verification parameter $v_d$ on the CAN such that a receiver module on the CAN having a filter that comprises the CAN identity $id_{c1}$ receives the broadcasted information and validates the received frame using the received verification parameter $v_d$.

According to an embodiment of the first aspect of the disclosure, the computing the keys for each node in each level in the tree structure comprises the key management module being configured to: for each child node in the tree structure, compute a key $k_c$ for the child node in the tree structure using a key generating function (KGF( )), a key of a parent node of the child node $k_p$ and an identifier identifying the child node $id_c$, the key $k_c$ being defined as $k_c$=KGF($k_p$, $id_c$).

According to an embodiment of the first aspect of the disclosure, the computing the CAN identity key $k_{c1}$ using the ascendant key $k_1$ associated with the ascendant node of the CAN identity $id_{c1}$ node and the root-node path identifier associated with the CAN identity $id_{c1}$ node comprises the broadcast module being configured to: compute the CAN identity key $k_{c1}$ using a key generating function (KGF( )), the CAN identity $id_{c1}$ and the ascendant key $k_1$ the key $k_{c1}$ being defined as $k_{c1}$=KGF($k_1$, $id_{c1}$) when the ascendant key $k_1$ is associated with a parent node of the node associated with the CAN identity $id_{c1}$ and when the root-node path identifier associated with the CAN identity $id_{c1}$ node comprises the CAN identity $id_{c1}$.

According to an embodiment of the first aspect of the disclosure, before the key management module sets the key for the root node $N_R$, the key management module is configured to: selectively insert at least one intermediate node between the root node $N_R$ and a root node of one of the sub-sets such that the intermediate node represents an ascendant node of the root node of one of the sub-sets.

According to an embodiment of the first aspect of the disclosure, the scheme parameter p comprises a local time T, the broadcast information further comprises the scheme parameter p and whereby the broadcast module is configured to: compute the verification parameter $v_d$ using the local time T, wherein the verification parameter $v_d$ is defined as $v_d$=MAC($k_{c1}$, T||$id_{c1}$||'frame') where MAC( ) is a message authentication code function, and 'frame' is the frame to be transmitted on the CAN.

According to an embodiment of the first aspect of the disclosure, the validation of the received frame by the receiver module comprises the receiver module being configured to: obtain the CAN identity key $k_{c1}$ and a receiver local time $T_R$; perform a first validation check on the validity of the received frame based on the received local time T and the obtained receiver local time $T_R$; perform a second validation check on the validity of the received frame by comparing the received verification parameter $v_d$ with a receiver verification parameter $v_{Rd}$, when the first validation check validates the received frame, wherein the receiver verification parameter $v_{Rd}$ is defined as $v_{Rd}$=MAC($k_{c1}$, T||$id_{c1}$||'frame') where MAC( ) is a message authentication code function, and 'frame' is the frame to be transmitted on the CAN; and processing the received frame when the second validation check validates the received frame.

According to an embodiment of the first aspect of the disclosure, the system further includes a gateway module configured to: obtain a gateway local time $T_G$; generate a general frame using the gateway local time $T_G$ that is transmitted and received by all the modules on the CAN such that when each module receives the general frame, each module is configured to: validate the received general frame; and synchronize local time of the module using the gateway local time $T_G$ when the received general frame is validated.

According to an embodiment of the first aspect of the disclosure, the scheme parameter p comprises a counter $CT_{c1}$ associated with the CAN identity $id_{c1}$ and whereby the broadcast module is configured to: increment the counter $CT_{c1}$ by one, compute the verification parameter $v_d$ using the counter $CT_{c1}$, wherein the verification parameter $v_d$ is defined as $v_d$=MAC($k_{c1}$, $CT_{c1}$||$id_{c1}$||'frame') where MAC( ) is a message authentication code function, and 'frame' is the frame to be transmitted on the CAN.

According to an embodiment of the first aspect of the disclosure, the validation of the received frame by the receiver module comprises the receiver module being configured to: obtain the CAN identity key $k_{c1}$ and a receiver counter $CT'_{c1}$ associated with the CAN identity $id_{c1}$; perform a validation check on the validity of the received frame by comparing the received verification parameter $v_d$ with a receiver verification parameter $v_{Rd}$, wherein the receiver verification parameter $v_{Rd}$ is defined as $v_{Rd}$=MAC($k_{c1}$, ($CT'_{c1}$+1)||$id_{c1}$||'frame') where MAC( ) is a message authentication code function, and 'frame' is the frame to be transmitted on the CAN; and increment the counter $CT'_{c1}$ by one and process the received frame when the validation check validates the received frame, wherein a gateway module is configured to synchronize the counter $CT_{c1}$ at the broadcast module and the counter $CT'_{c1}$ at the receiver module.

According to an embodiment of the first aspect of the disclosure, the gateway module is configured to synchronize the counter at the broadcast module and the receiver counter at the receiver module by: obtaining the counter $CT_{c1}$ associated with the CAN identity $id_{c1}$; generating a counter frame using the counter $CT_{c1}$ and the CAN identity $id_{c1}$; broadcasting the counter frame on the CAN such that when each module on the CAN having a counter receives the counter frame, each module is configured to: synchronize the counter in the module using the received counter frame.

According to an embodiment of the first aspect of the disclosure, the scheme parameter p comprises a nonce N and whereby the broadcast module is configured to: compute the verification parameter $v_d$ using the nonce N, wherein the verification parameter $v_d$ is defined as $v_d$=MAC($k_{c1}$, N∥$id_{c1}$∥'frame') where MAC( ) is a message authentication code function, and 'frame' is the frame to be transmitted on the CAN.

According to an embodiment of the first aspect of the disclosure, the validation of the received frame by the receiver module comprises the receiver module being configured to: obtain the CAN identity key $k_{c1}$ and a receiver nonce N'; perform a validation check on the validity of the received frame by comparing the received verification parameter $v_d$ with a receiver verification parameter $v_{Rd}$, wherein the receiver verification parameter $v_{Rd}$ is defined as $v_{Rd}$=MAC($k_{c1}$, N'∥$id_{c1}$∥'frame') where MAC( ) is a message authentication code function, and 'frame' is the frame to be transmitted on the CAN; and processing the received frame when the validation check validates the received frame, wherein a gateway module is configured to synchronize the nonce N at the broadcast module and the nonce N' at the receiver module.

According to an embodiment of the first aspect of the disclosure, the gateway module is configured to periodically broadcast nonces at the broadcast module and the receiver module by: generating the nonce N; generating a nonce frame using the nonce N; broadcasting the nonce frame on the CAN such that when each module on the CAN receives the nonce frame, each module is configured to: receive and store the nonce in the module using the received nonce frame.

According to an embodiment of the first aspect of the disclosure, the scheme parameter p comprises a local time T and a counter $CT_{c1}$ associated with the CAN identity $id_{c1}$, and the broadcast information further comprises the scheme parameter p, whereby the broadcast module is configured to: increment the counter $CT_{c1}$ by one and compute the verification parameter $v_d$ using the local time T and the counter $CT_{c1}$, wherein the verification parameter $v_d$ is defined as $v_d$=MAC($k_{c1}$, T∥$CT_{c1}$∥$id_{c1}$∥'frame') where MAC( ) is a message authentication code function, and 'frame' is the frame to be transmitted on the CAN.

According to an embodiment of the first aspect of the disclosure, the validation of the received frame by the receiver module comprises the receiver module being configured to: obtain the CAN identity key $k_{c1}$, a receiver local time $T_R$ and a receiver counter $CT'_{c1}$ associated with the CAN identity $id_{c1}$; perform a first validation check on the validity of the received frame based on the received local time T and the obtained receiver local time $T_R$; perform a second validation check on the validity of the received frame by comparing the received verification parameter $v_d$ with a receiver verification parameter $v_{Rd}$, when the first validation check validates the received frame, wherein the receiver verification parameter $v_{Rd}$ is defined as $v_{Rd}$=MAC($k_{c1}$, T∥($CT'_{c1}$+1)∥$id_{c1}$∥'frame') where MAC( ) is a message authentication code function, and 'frame' is the frame to be transmitted on the CAN; and increment the counter $CT'_{c1}$ by one and process the received frame when the second validation check validates the received frame, wherein a gateway module is configured to synchronize the counter $CT_{c1}$ at the broadcast module and the counter $CT'_{c1}$ at the receiver module.

According to an embodiment of the first aspect of the disclosure, the gateway module is further configured to: obtain a gateway local time $T_G$; generate a general frame using the gateway local time $T_G$ that is transmitted and received by all the modules on the CAN such that when each module receives the general frame, each module is configured to: validate the received general frame; synchronize local time of the module using the gateway local time $T_G$ when the received general frame is validated; and reset the counter in the module.

According to an embodiment of the first aspect of the disclosure, the gateway module is configured to synchronize the counter at the broadcast module and the receiver module by: obtaining the counter $CT_{c1}$ associated with the CAN identity $id_{c1}$; generating a counter frame using the counter $CT_{c1}$ and the CAN identity $id_{c1}$; broadcasting the counter frame on the CAN such that when each module on the CAN having the counter receives the counter frame, each module is configured to: synchronize the counter in the module using the received counter frame.

According to an embodiment of the first aspect of the disclosure, the scheme parameter p comprises a nonce N and a counter $CT_{c1}$ associated with the CAN identity $id_{c1}$, and whereby the broadcast module is configured to: increment the counter $CT_{c1}$ by one and compute the verification parameter $v_d$ using the nonce N and the counter $CT_{c1}$, wherein the verification parameter $v_d$ is defined as $v_d$=MAC($k_{c1}$, N∥$CT_{c1}$∥$id_{c1}$∥'frame') where MAC( ) is a message authentication code function, and 'frame' is the frame to be transmitted on the CAN.

According to an embodiment of the first aspect of the disclosure, the validation of the received frame by the receiver module comprises the receiver module being configured to: obtain the CAN identity key $k_{c1}$, a receiver nonce N' and a receiver counter $CT'_{c1}$ associated with the CAN identity $id_{c1}$; perform a validation check on the validity of the received frame by comparing the received verification parameter $v_d$ with a receiver verification parameter $v_{Rd}$, wherein the receiver verification parameter $v_{Rd}$ is defined as $v_{Rd}$=MAC($k_{c1}$, N'∥($CT'_{c1}$+1)∥$id_{c1}$∥'frame') where MAC( ) is a message authentication code function, and 'frame' is the frame to be transmitted on the CAN; and increment the counter $CT'_{c1}$ by one and process the received frame when the validation check validates the received frame, wherein a gateway module is configured to broadcast the nonce N at the broadcast module, the nonce N' at the receiver module, and synchronize the counter $CT_{c1}$ at the broadcast module and the counter $CT'_{c1}$ at the receiver module.

According to an embodiment of the first aspect of the disclosure, the gateway module is configured to synchronize the counter at the broadcast module and the receiver module by: obtaining the counter $CT_{c1}$ associated with the CAN identity $id_{c1}$; generating a counter frame using the counter $CT_{c1}$ and the CAN identity $id_{c1}$; broadcasting the counter frame on the CAN such that when each module on the CAN receives the counter frame, each module is configured to: synchronize the counter in the module using the received counter frame.

According to an embodiment of the first aspect of the disclosure, the gateway module is configured to periodically broadcast the nonces at the broadcast module and the receiver module by: generating the nonce N; generating a nonce frame using the nonce N; broadcasting the nonce frame on the CAN such that when each module on the CAN receives the nonce frame, each module is configured to: validate and store the nonce in the module using the received nonce frame.

According to an embodiment of the first aspect of the disclosure, the obtaining the CAN identity key $k_{c1}$ comprises the receiver module being configured to: retrieve the CAN identity key $k_{c1}$ that is preloaded into the receiver module by the key management module.

According to an embodiment of the first aspect of the disclosure, the obtaining the CAN identity key $k_{c1}$ comprises the receiver module being configured to: compute the CAN identity key $k_{c1}$ using the CAN identity $id_{c1}$ and a key of an ascendant node, wherein the key of the ascendant node is preloaded into the receiver module by the key management module.

According to a second aspect of the disclosure, a key management module provided in a vehicle for generating a hierarchical tree structure for CAN identities in a CAN network is disclosed, the key management module comprising: a processor; and a non-transitory media readable by the processor, the non-transitory media storing instructions that when executed by the processor, cause the processor to: organize CAN identities of the CAN into sub-sets based on functionalities of the CAN identities, wherein each sub-set is arranged as a tree structure having a root node which could represent a function of the sub-set; arrange the sub-sets of CAN identities into a tree structure having a root node $N_R$, wherein the root nodes of the sub-sets are arranged as descendant nodes of root node $N_R$; and set a key for the root node $N_R$ and compute keys for each node in each level in the tree structure, starting from child nodes of the root node $N_R$, wherein a key of a child node in the tree structure is computed using a key of a parent node and an identifier identifying the child node.

According to an embodiment of the second aspect of the disclosure, the instructions for directing the processor to compute the keys for each node in each level in the tree structure comprises: for each child node in the tree structure, instructions for directing the processor to: compute a key $k_c$ for the child node in the tree structure using a key generating function (KGF( )), a key of a parent node of the child node $k_p$ and an identifier identifying the child node $id_c$, the key $k_c$ being defined as $k_c = KGF(k_p, id_c)$.

According to an embodiment of the second aspect of the disclosure, before the instructions for directing the processor to set the key for the root node $N_R$, the key management module is configured to: selectively insert at least one intermediate node between the root node $N_R$ and a root node of one of the sub-sets such that the intermediate node represents an ascendant node of the root node of one of the sub-sets.

According to a third aspect of the disclosure, a broadcast module provided in a vehicle for broadcasting secure communications to modules in a CAN is disclosed, the broadcast module comprising: a processor; and a non-transitory media readable by the processor, the non-transitory media storing instructions that when executed by the processor, cause the processor to: generate a frame to be transmitted on the CAN whereby the frame is associated with a CAN identity $id_{c1}$ selected from the CAN identities; compute a CAN identity key $k_{c1}$ using an ascendant key $k_1$ associated with an ascendant node of the CAN identity $id_{c1}$ node and a root-node path identifier associated with the CAN identity $id_{c1}$ node wherein the ascendant key $k_1$ is retrieved from a key management module and the root-node path identifier comprises a value assigned to the CAN identity $id_{c1}$ node; obtain a scheme parameter p and compute a verification parameter $v_d$ based on the scheme parameter p, the key $k_{c1}$, the CAN identity $id_{c1}$ and the frame to be transmitted wherein the scheme parameter p comprises a variable unique to the scheme; broadcast information comprising the frame associated with the CAN identity $id_{c1}$ and the verification parameter $v_d$ on the CAN such that a receiver module on the CAN having a filter that comprises the CAN identity $id_{c1}$ receives the broadcasted information and validates the received frame using the received verification parameter $v_d$.

According to an embodiment of the third aspect of the disclosure, the instructions for directing the processor to compute the CAN identity key $k_{c1}$ using the ascendant key $k_1$ associated with the ascendant node of the CAN identity $id_{c1}$ node and the root-node path identifier associated with the CAN identity $id_{c1}$ node comprises: instructions for directing the processor to: compute the CAN identity key $k_{c1}$ using a key generating function (KGF( )), the CAN identity $id_{c1}$ and the ascendant key $k_1$, the key $k_{c1}$ being defined as $k_{c1} = KGF(k_1, id_{c1})$ when the ascendant key $k_1$ is associated with a parent node of the node associated with the CAN identity $id_{c1}$ and when the root-node path identifier associated with the CAN identity $id_{c1}$ node comprises the CAN identity $id_{c1}$.

Optionally, the scheme parameter p comprises a local time T, and the broadcast information further comprises the scheme parameter p and whereby the broadcast module comprises: instructions for directing the processor to: compute the verification parameter $v_d$ using the local time T, wherein the verification parameter $v_d$ is defined as $v_d = MAC(k_{c1}, T||id_{c1}||\text{'frame'})$ where MAC( ) is a message authentication code function, and 'frame' is the frame to be transmitted on the CAN.

Optionally, a receiver module provided in a vehicle for receiving a broadcast information in a CAN, wherein the broadcast information comprises a frame associated with a CAN identity $id_{c1}$, a local time T and the verification parameter $v_d$ whereby the verification parameter $v_d$ is defined as $v_d = MAC(k_{c1}, T||id_{c1}||\text{'frame'})$ where MAC( ) is a message authentication code function, $k_{c1}$ is a CAN identity key $k_{c1}$ and 'frame' is the frame broadcasted on the CAN is disclosed, the receiver module comprising: a processor; and a non-transitory media readable by the processor, the non-transitory media storing instructions that when executed by the processor, cause the processor to: obtain the CAN identity key $k_{c1}$ and a receiver local time $T_R$; perform a first validation check on the validity of the received frame based on the received local time T and the obtained receiver local time $T_R$; perform a second validation check on the validity of the received frame by comparing the received verification parameter $v_d$ with a receiver verification parameter $v_{Rd}$, when the first validation check validates the received frame, wherein the receiver verification parameter $v_{Rd}$ is defined as $v_{Rd} = MAC(k_{c1}, T||id_{c1}||\text{'frame'})$ where MAC( ) is a message authentication code function, and 'frame' is the frame to be transmitted on the CAN; and processing the received frame when the second validation check validates the received frame.

Optionally, a gateway module provided in a vehicle for synchronizing local time of modules in a CAN is disclosed, the gateway module comprising: a processor; and a non-transitory media readable by the processor, the non-transitory media storing instructions that when executed by the processor, cause the processor to: obtain a gateway local time $T_G$; generate a general frame using the gateway local time $T_G$ that is transmitted and received by all the modules on the CAN such that when each module receives the general frame, each module is configured to: validate the received general frame; and synchronize local time of the module using the gateway local time TG when the received general frame is validated.

Optionally, the scheme parameter p comprises a counter $CT_{c1}$ associated with the CAN identity $id_{c1}$ and whereby the broadcast module comprises: instructions for directing the processor to: increment the counter $CT_{c1}$ by one, compute the verification parameter $v_d$ using the counter $CT_{c1}$, wherein the verification parameter $v_d$ is defined as $v_d$=MAC$(k_{c1}, CT_{c1}||id_{c1}||\text{'frame'})$ where MAC( ) is a message authentication code function, and 'frame' is the frame to be transmitted on the CAN.

Optionally, a receiver module provided in a vehicle for receiving a broadcast information in a CAN, wherein the broadcast information comprises a frame associated with a CAN identity $id_{c1}$ and a verification parameter $v_d$ whereby the verification parameter $v_d$ is defined as $v_d$=MAC$(k_{c1}, CT_{c1}||id_{c1}||\text{'frame'})$ where MAC( ) is a message authentication code function, $k_{c1}$ is a CAN identity key $k_{c1}$, $CT_{c1}$ is a counter $CT_{c1}$ set by a broadcast module and 'frame' is the frame to be transmitted on the CAN is disclosed, the receiver module comprising: a processor; and a non-transitory media readable by the processor, the non-transitory media storing instructions that when executed by the processor, cause the processor to: obtain the CAN identity key $k_{c1}$ and a receiver counter $CT'_{c1}$ associated with the CAN identity $id_{c1}$; perform a validation check on the validity of the received frame by comparing the received verification parameter $v_d$ with a receiver verification parameter $v_{Rd}$, wherein the receiver verification parameter $v_{Rd}$ is defined as $v_{Rd}$=MAC$(k_{c1}, (CT'_{c1}+1)||id_{c1}||\text{'frame'})$ where MAC( ) is a message authentication code function, and 'frame' is the frame to be transmitted on the CAN; and increment the counter $CT'_{c1}$ by one and process the received frame when the validation check validates the received frame, wherein a gateway module is configured to synchronize the counter $CT_{c1}$ at the broadcast module and the counter $CT'_{c1}$ at the receiver module.

Optionally, a gateway module provided in a vehicle for synchronizing a counter of modules in a CAN is disclosed, the gateway module comprising: a processor; and a non-transitory media readable by the processor, the non-transitory media storing instructions that when executed by the processor, cause the processor to: obtain the counter $CT_{c1}$ associated with the CAN identity $id_{c1}$; generate a counter frame using the counter $CT_{c1}$ and the CAN identity $id_{c1}$; broadcast the counter frame on the CAN such that when each module on the CAN having a counter receives the counter frame, each module is configured to: synchronize the counter in the module using the received counter frame.

Optionally, the scheme parameter p comprises a nonce N and whereby the broadcast module comprises: instructions for directing the processor to: compute the verification parameter $v_d$ using the nonce N, wherein the verification parameter $v_d$ is defined as $v_d$=MAC$(k_{c1}, N||id_{c1}||\text{'frame'})$ where MAC( ) is a message authentication code function, and 'frame' is the frame to be transmitted on the CAN.

Optionally, a receiver module provided in a vehicle for receiving a broadcast information in a CAN, wherein the broadcast information comprises a frame associated with a CAN identity $id_{c1}$ and a verification parameter $v_d$ whereby the verification parameter $v_d$ is defined as $v_d$=MAC$(k_{c1}, N||id_{c1}||\text{'frame'})$ where MAC( ) is a message authentication code function, $k_{c1}$ is a CAN identity key $k_{c1}$, N is a nonce set by a broadcast module and 'frame' is the frame to be transmitted on the CAN is disclosed, the receiver module comprising: a processor; and a non-transitory media readable by the processor, the non-transitory media storing instructions that when executed by the processor, cause the processor to: obtain the CAN identity key $k_{c1}$ and a receiver nonce N'; perform a validation check on the validity of the received frame by comparing the received verification parameter $v_d$ with a receiver verification parameter $v_{Rd}$, wherein the receiver verification parameter $v_{Rd}$ is defined as $v_{Rd}$=MAC$(k_{c1}, N'||id_{c1}||\text{'frame'})$ where MAC( ) is a message authentication code function, and 'frame' is the frame to be transmitted on the CAN; and process the received frame when the validation check validates the received frame, wherein a gateway module is configured to synchronize the nonce N at the broadcast module and the nonce N' at the receiver module.

Optionally, a gateway module provided in a vehicle for synchronizing a nonce of modules in a CAN is disclosed, the gateway module comprising: a processor; and a non-transitory media readable by the processor, the non-transitory media storing instructions that when executed by the processor, cause the processor to: generate the nonce N; generate a nonce frame using the nonce N; broadcast the nonce frame on the CAN such that when each module on the CAN receives the nonce frame, each module is configured to: receive and store the nonce in the module using the received nonce frame.

Optionally, the scheme parameter p comprises a local time T and a counter $CT_{c1}$ associated with the CAN identity $id_{c1}$, and the broadcast information further comprises the scheme parameter p, whereby the broadcast module comprises: instructions for directing the processor to: increment the counter $CT_{c1}$ by one and compute the verification parameter $v_d$ using the local time T and the counter $CT_{c1}$, wherein the verification parameter $v_d$ is defined as $v_d$=MAC$(k_{c1}, T||CT_{c1}||id_{c1}||\text{'frame'})$ where MAC( ) is a message authentication code function, and 'frame' is the frame to be transmitted on the CAN.

Optionally, a receiver module provided in a vehicle for receiving a broadcast information in a CAN, wherein the broadcast information comprises a frame associated with a CAN identity $id_{c1}$, a local time T and the verification parameter $v_d$ whereby the verification parameter $v_d$ is defined as $v_d$=MAC$(k_{c1}, T||CT_{c1}||id_{c1}||\text{'frame'})$ where MAC( ) is a message authentication code function, $k_{c1}$ is a CAN identity key $k_{c1}$, $CT_{c1}$ is a counter $CT_{c1}$ set by a broadcast module and 'frame' is the frame to be transmitted on the CAN is disclosed, the receiver module comprising: a processor; and a non-transitory media readable by the processor, the non-transitory media storing instructions that when executed by the processor, cause the processor to: obtain the CAN identity key $k_{c1}$, a receiver local time $T_R$ and a receiver counter $CT'_{c1}$ associated with the CAN identity $id_{c1}$; perform a first validation check on the validity of the received frame based on the received local time T and the obtained receiver local time $T_R$; perform a second validation check on the validity of the received frame by comparing the received verification parameter $v_d$ with a receiver verification parameter $v_{Rd}$, when the first validation check validates the received frame, wherein the receiver verification parameter $v_{Rd}$ is defined as $v_{Rd}$=MAC$(k_{c1}, T||(CT'_{c1}+1)||id_{c1}||\text{'frame'})$ where MAC( ) is a message authentication code function, and 'frame' is the frame to be transmitted on the CAN; and increment the counter $CT'_{c1}$ by one and process the received frame when the second validation check validates the received frame, wherein a gateway module is configured to synchronize the counter $CT_{c1}$ at the broadcast module and the counter $CT'_{c1}$ at the receiver module.

Optionally, the scheme parameter p comprises a nonce N and a counter $CT_{c1}$ associated with the CAN identity $id_{c1}$, and whereby the broadcast module comprises: instructions for directing the processor to: increment the counter $CT_{c1}$ by one and compute the verification parameter $v_d$ using the nonce N and the counter $CT_{c1}$, wherein the verification parameter $v_d$ is defined as $v_d$=MAC($k_{c1}$, N‖$CT_{c1}$‖$id_{c1}$‖'frame') where MAC( ) is a message authentication code function, and 'frame' is the frame to be transmitted on the CAN.

Optionally, a receiver module provided in a vehicle for receiving a broadcast information in a CAN, wherein the broadcast information comprises a frame associated with a CAN identity $id_{c1}$ and the verification parameter $v_d$ whereby the verification parameter $v_d$ is defined as $v_d$=MAC($k_{c1}$, N‖$CT_{c1}$‖$id_{c1}$‖'frame') where MAC( ) is a message authentication code function, N is a nonce set by a broadcast module, $CT_{c1}$ is a counter $CT_{c1}$ set by the broadcast module and 'frame' is the frame to be transmitted on the CAN is disclosed, the receiver module comprising: a processor; and a non-transitory media readable by the processor, the non-transitory media storing instructions that when executed by the processor, cause the processor to: obtain the CAN identity key $k_{c1}$, a receiver nonce N' and a receiver counter $CT'_{c1}$ associated with the CAN identity $k_{c1}$; perform a validation check on the validity of the received frame by comparing the received verification parameter $v_d$ with a receiver verification parameter $v_{Rd}$, wherein the receiver verification parameter $v_{Rd}$ is defined as $v_{Rd}$=MAC($k_{c1}$, N'‖($CT'_{c1}$+1)‖$id_{c1}$‖'frame') where MAC( ) is a message authentication code function, and 'frame' is the frame to be transmitted on the CAN; and increment the counter $CT'_{c1}$ by one and process the received frame when the validation check validates the received frame, wherein a gateway module is configured to broadcast the nonce N at the broadcast module, the nonce N' at the receiver module, and synchronize the counter $CT_{c1}$ at the broadcast module and the counter $CT'_{c1}$ at the receiver module.

According to a fourth aspect of the disclosure, a method for generating a hierarchical tree structure for CAN identities in a CAN network is disclosed, the method using a key management module provided in a vehicle comprising: organizing CAN identities of the CAN into sub-sets based on functionalities of the CAN identities, wherein each sub-set is arranged as a tree structure having a root node which could represent a function of the sub-set; arranging the sub-sets of CAN identities into a tree structure having a root node $N_R$, wherein the root nodes of the sub-sets are arranged as descendant nodes of root node $N_R$; and setting a key for the root node $N_R$ and computing keys for each node in each level in the tree structure, starting from child nodes of the root node $N_R$, wherein a key of a child node in the tree structure is computed using a key of a parent node and an identifier identifying the child node.

According to an embodiment of the fourth aspect of the disclosure, the computing the keys for each node in each level in the tree structure comprises: for each child node in the tree structure, computing a key $k_c$ for the child node in the tree structure using a key generating function (KGF( )), a key of a parent node of the child node $k_p$ and an identifier identifying the child node $id_c$, the key $k_c$ being defined as $k_c$=KGF($k_p$, $id_c$).

According to an embodiment of the fourth aspect of the disclosure, before the setting the key for the root node $N_R$, the method comprises the step of: selectively inserting at least one intermediate node between the root node $N_R$ and a root node of one of the sub-sets such that the intermediate node represents an ascendant node of the root node of one of the sub-sets.

According to a fifth aspect of the disclosure, a method for broadcasting secure communications to modules in a CAN using a broadcast module provided in a vehicle comprising: generating a frame to be transmitted on the CAN whereby the frame is associated with a CAN identity $id_{c1}$ selected from the CAN identities; computing a CAN identity key $k_{c1}$ using an ascendant key $k_1$ associated with an ascendant node of the CAN identity $id_{c1}$ node and a root-node path identifier associated with the CAN identity $id_{c1}$ node wherein the ascendant key $k_1$ is retrieved from a key management module and the root-node path identifier comprises a value assigned to the CAN identity $id_{c1}$ node; obtaining a scheme parameter p and compute a verification parameter $v_d$ based on the scheme parameter p, the key $k_{c1}$, the CAN identity $id_{c1}$ and the frame to be transmitted, wherein the scheme parameter p comprises a variable unique to the scheme; broadcasting information comprising the frame associated with the CAN identity $id_{c1}$ and the verification parameter $v_d$ on the CAN such that a receiver module on the CAN having a filter that comprises the CAN identity $id_{c1}$ receives the broadcasted information and validates the received frame using the received verification parameter $v_d$.

According to an embodiment of the fifth aspect of the disclosure, the computing the CAN identity key $k_{c1}$ using the ascendant key $k_1$ associated with the ascendant node of the CAN identity $id_{c1}$ node and the root-node path identifier associated with the CAN identity $id_{c1}$ node comprises: computing the CAN identity key $k_{c1}$ using a key generating function (KGF( )), the CAN identity $id_{c1}$ and the ascendant key $k_1$, the key $k_{c1}$ being defined as $k_{c1}$=KGF($k_1$, $id_{c1}$) when the ascendant key $k_1$ is associated with a parent node of the node associated with the CAN identity $id_{c1}$ and when the root-node path identifier associated with the CAN identity $id_{c1}$ node comprises the CAN identity $id_{c1}$.

Optionally, the scheme parameter p comprises a local time T, and the broadcast information further comprises the scheme parameter p and whereby the method comprises the step of: computing the verification parameter $v_d$ using the local time T, wherein the verification parameter $v_d$ is defined as $v_d$=MAC($k_{c1}$, T‖$id_{c1}$‖'frame') where MAC( ) is a message authentication code function, and 'frame' is the frame to be transmitted on the CAN.

Optionally, a method for receiving a broadcast information in a CAN, wherein the broadcast information comprises a frame associated with a CAN identity $id_{c1}$, a local time T and the verification parameter $v_d$ whereby the verification parameter $v_d$ is defined as $v_d$=MAC($k_{c1}$, T‖$id_{c1}$‖'frame') where MAC( ) is a message authentication code function, $k_{c1}$ is a CAN identity key $k_{c1}$ and 'frame' is the frame broadcasted on the CAN is disclosed, the method using a receiver module provided in a vehicle comprising: obtaining the CAN identity key $k_{c1}$ and a receiver local time $T_R$; performing a first validation check on the validity of the received frame based on the received local time T and the obtained receiver local time $T_R$; performing a second validation check on the validity of the received frame by comparing the received verification parameter $v_d$ with a receiver verification parameter $v_{Rd}$, when the first validation check validates the received frame, wherein the receiver verification parameter $v_{Rd}$ is defined as $v_{Rd}$=MAC($k_{c1}$, T‖$id_{c1}$‖'frame') where MAC( ) is a message authentication code function, and 'frame' is the frame to be transmitted on the CAN; and processing the received frame when the second validation check validates the received frame.

Optionally, a method for synchronizing local time of modules in a CAN is disclosed, the method using a gateway module provided in a vehicle comprising: obtaining a gateway local time $T_G$; generating a general frame using the gateway local time $T_G$ that is transmitted and received by all the modules on the CAN such that when each module receives the general frame, each module is configured to: validating the received general frame; and synchronizing local time of the module using the gateway local time TG when the received general frame is validated.

Optionally, the scheme parameter p comprises a counter $CT_{c1}$ associated with the CAN identity $id_{c1}$ and whereby the method comprises the step of: incrementing the counter $CT_{c1}$ by one, compute the verification parameter $v_d$ using the counter $CT_{c1}$, wherein the verification parameter $v_d$ is defined as $v_d$=MAC($k_{c1}$, $CT_{c1}\|id_{c1}\|$'frame') where MAC( ) is a message authentication code function, and 'frame' is the frame to be transmitted on the CAN.

Optionally, a method for receiving a broadcast information in a CAN, wherein the broadcast information comprises a frame associated with a CAN identity $id_{c1}$ and a verification parameter $v_d$ whereby the verification parameter $v_d$ is defined as $v_d$=MAC($k_{c1}$, $CT_{c1}\|id_{c1}\|$'frame') where MAC( ) is a message authentication code function, $k_{c1}$ is a CAN identity key $k_{c1}$, $CT_{c1}$ is a counter $CT_{c1}$ set by a broadcast module and 'frame' is the frame to be transmitted on the CAN, the method using a receiver module provided in a vehicle comprising: obtaining the CAN identity key $k_{c1}$ and a receiver counter $CT'_{c1}$ associated with the CAN identity $id_{c1}$; performing a validation check on the validity of the received frame by comparing the received verification parameter $v_d$ with a receiver verification parameter $v_{Rd}$, wherein, the receiver verification parameter $v_{Rd}$ is defined as $v_{Rd}$=MAC($k_{c1}$, ($CT'_{c1}$+1)$\|id_{c1}\|$'frame') where MAC( ) is a message authentication code function, and 'frame' is the frame to be transmitted on the CAN; and incrementing the counter $CT'_{c1}$ by one and processing the received frame when the validation check validates the received frame, wherein a gateway module is configured to synchronize the counter $CT_{c1}$ at the broadcast module and the counter $CT'_{c1}$ at the receiver module.

Optionally, a method for synchronizing a counter of modules in a CAN, the method using a gateway module provided in a vehicle comprising: obtaining the counter $CT_{c1}$ associated with the CAN identity $id_{c1}$; generating a counter frame using the counter $CT_{c1}$ and the CAN identity $id_{c1}$; broadcasting the counter frame on the CAN such that when each module on the CAN having a counter receives the counter frame, each module is configured to: synchronize the counter in the module using the received counter frame.

Optionally, the scheme parameter p comprises a nonce N and whereby the method comprises the step of: computing the verification parameter $v_d$ using the nonce N, wherein the verification parameter $v_d$ is defined as $v_d$=MAC($k_{c1}$, N$\|id_{c1}\|$'frame') where MAC( ) is a message authentication code function, and 'frame' is the frame to be transmitted on the CAN.

Optionally, a method for receiving a broadcast information in a CAN, wherein the broadcast information comprises a frame associated with a CAN identity $id_{c1}$ and a verification parameter $v_d$ whereby the verification parameter $v_d$ is defined as $v_d$=MAC($k_{c1}$, N$\|id_{c1}\|$'frame') where MAC( ) is a message authentication code function, $k_{c1}$ is a CAN identity key $k_{c1}$, N is a nonce set by a broadcast module and 'frame' is the frame to be transmitted on the CAN is disclosed, the method using a receiver module provided in a vehicle comprising: obtaining the CAN identity key $k_{c1}$ and a receiver nonce N'; performing a validation check on the validity of the received frame by comparing the received verification parameter $v_d$ with a receiver verification parameter $v_{Rd}$, wherein, the receiver verification parameter $v_{Rd}$ is defined as $v_{Rd}$=MAC($k_{c1}$, N'$\|id_{c1}\|$'frame') where MAC( ) is a message authentication code function, and 'frame' is the frame to be transmitted on the CAN; and processing the received frame when the validation check validates the received frame, wherein a gateway module is configured to synchronize the nonce N at the broadcast module and the nonce N' at the receiver module.

Optionally, a method for synchronizing a nonce of modules in a CAN, the method using a gateway module provided in a vehicle comprising: generating the nonce N; generating a nonce frame using the nonce N; broadcasting the nonce frame on the CAN such that when each module on the CAN receives the nonce frame, each module is configured to: receive and store the nonce in the module using the received nonce frame.

Optionally, the scheme parameter p comprises a local time T and a counter $CT_{c1}$ associated with the CAN identity $id_{c1}$, and the broadcast information further comprises the scheme parameter p, whereby the method comprises the step of: incrementing the counter $CT_{c1}$ by one and compute the verification parameter $v_d$ using the local time T and the counter $CT_{c1}$, wherein the verification parameter $v_d$ is defined as $v_d$=MAC($k_{c1}$, T$\|CT_{c1}\|id_{c1}\|$'frame') where MAC( ) is a message authentication code function, and 'frame' is the frame to be transmitted on the CAN.

Optionally, a method for receiving a broadcast information in a CAN, wherein the broadcast information comprises a frame associated with a CAN identity $id_{c1}$, a local time T and the verification parameter $v_d$ whereby the verification parameter $v_d$ is defined as as $v_d$=MAC($k_{c1}$, T$\|CT_{c1}\|id_{c1}\|$'frame') where MAC( ) is a message authentication code function, $k_{c1}$ is a CAN identity key $k_{c1}$, $CT_{c1}$ is a counter $CT_{c1}$ set by a broadcast module and 'frame' is the frame to be transmitted on the CAN is disclosed, the method using a receiver module provided in a vehicle comprising: obtaining the CAN identity key $k_{c1}$, a receiver local time $T_R$ and a receiver counter $CT'_{c1}$ associated with the CAN identity $id_{c1}$; performing a first validation check on the validity of the received frame based on the received local time T and the obtained receiver local time $T_R$; performing a second validation check on the validity of the received frame by comparing the received verification parameter $v_d$ with a receiver verification parameter $v_{Rd}$, when the first validation check validates the received frame, wherein the receiver verification parameter $v_{Rd}$ is defined as $v_{Rd}$=MAC($k_{c1}$, T$\|(CT'_{c1}$+1)$\|id_{c1}\|$'frame') where MAC( ) is a message authentication code function, and 'frame' is the frame to be transmitted on the CAN; and incrementing the counter $CT'_{c1}$ by one and process the received frame when the second validation check validates the received frame, wherein a gateway module is configured to synchronize the counter $CT_{c1}$ at the broadcast module and the counter $CT'_{c1}$ at the receiver module.

Optionally, the scheme parameter p comprises a nonce N and a counter $CT_{c1}$ associated with the CAN identity $id_{c1}$, and whereby the method comprises the step of: incrementing the counter $CT_{c1}$ by one and compute the verification parameter $v_d$ using the nonce N and the counter $CT_{c1}$, wherein the verification parameter $v_d$ is defined as $v_d$=MAC($k_{c1}$, N$\|CT_{c1}\|id_{c1}\|$'frame') where MAC( ) is a message authentication code function, and 'frame' is the frame to be transmitted on the CAN.

Optionally, a method for receiving a broadcast information in a CAN, wherein the broadcast information comprises a frame associated with a CAN identity $id_{c1}$ and the verification parameter $v_d$ whereby the verification parameter $v_d$ is defined as $v_d = MAC(k_{c1}, N\|CT_{c1}\|id_{c1}\|\text{'frame'})$ where MAC( ) is a message authentication code function, N is a nonce set by a broadcast module, $CT_{c1}$ is a counter $CT_{c1}$ set by the broadcast module and 'frame' is the frame to be transmitted on the CAN is disclosed, the method using a receiver module provided in a vehicle comprising: obtaining the CAN identity key $k_{c1}$, a receiver nonce N' and a receiver counter $CT'_{c1}$ associated with the CAN identity $id_{c1}$; performing a validation check on the validity of the received frame by comparing the received verification parameter $v_d$ with a receiver verification parameter $v_{Rd}$, wherein, the receiver verification parameter $v_{Rd}$ is defined as $v_{Rd} = MAC(k_{c1}, N'\|(CT'_{c1}+1)\|id_{c1}\|\text{'frame'})$ where MAC( ) is a message authentication code function, and 'frame' is the frame to be transmitted on the CAN; and incrementing the counter $CT'_{c1}$ by one and process the received frame when the validation check validates the received frame, wherein a gateway module is configured to broadcast the nonce N at the broadcast module, the nonce N' at the receiver module, and synchronize the counter $CT_{c1}$ at the broadcast module and the counter $CT'_{c1}$ at the receiver module.

BRIEF DESCRIPTION OF THE DRAWINGS

The above advantages and features in accordance with this invention are described in the following detailed description and are shown in the following drawings.

DETAILED DESCRIPTION

This disclosure relates to a system and method for managing communications between modules in a CAN in a secure manner. In particular, the system employs a hierarchical key generation method to generate keys for all the CAN identities in the CAN network. Any module in the CAN network may then utilize a single ascendant key together with relevant identifiers to generate descendant keys for CAN identities in the CAN network. Keys generated for CAN identities are then used by the broadcast and receiver CAN modules to generate verification parameters that are then utilized by the broadcast and receiver CAN modules to carry out the authentication of published messages.

One skilled in the art will recognize that many functional units in this description have been labelled as modules throughout the specification. The person skilled in the art will also recognize that a module may be implemented as circuits, logic chips or any sort of discrete component. Further, one skilled in the art will also recognize that a module may be implemented in software, which may then be executed by a variety of processors. In embodiments of the disclosure, a module may also comprise computer instructions or executable code that may instruct a computer processor to carry out a sequence of events based on instructions received. The choice of the implementation of the modules is left as a design choice to a person skilled in the art and does not limit the scope of this invention in any way.

Figure 1:
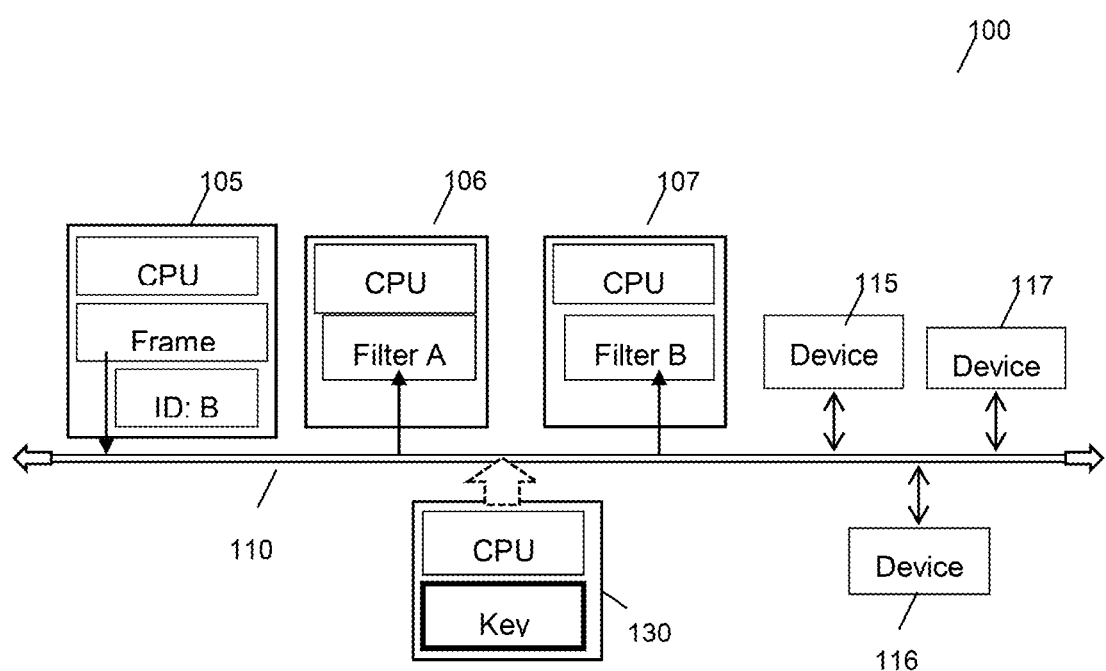
FIG. 1 illustrates a block diagram representative of modules and devices in a CAN.

FIG. 1 illustrates a system 100 for managing secure communications between modules in a CAN network. System 100 illustrated in FIG. 1 comprises modules 105, 106 and 107, devices 115, 116 and 117, gateway module 130 and CAN bus 110. Further, although FIG. 1 only illustrates three modules, one gateway module and three devices, one skilled in the art will recognize that any number of modules, devices and gateways may be employed in system 100 without departing from the embodiments. In embodiments of the disclosure, modules 105-107 may comprise devices such as, but are not limited to, electronic control units (ECUs) that are used to control various subsystems in a modern vehicle.

CAN bus 110 may comprise a two wire bus that is used to connect all the nodes in the CAN network together. One skilled in the art will recognize that nodes in a CAN network may refer to any simple I/O devices such as devices 115, 116 or 117 or embedded computers provided with a CAN interface such as modules 105, 106 or 107. Further, a node on a CAN network may also refer to a gateway module that allows external computers to communicate over a universal serial bus (USB) or Ethernet port to the devices and/or modules in the CAN network.

In embodiments of the disclosure, devices 115-117 may comprise I/O devices such as sensors, e.g. speed, light, parking, temperature sensors and etc., or actuators for controlling hydraulic or mechanical mechanisms in the car, e.g. power window, steering, seat actuators and etc.

Each of modules 105-107 are provided with a processor (CPU) and CAN-specific hardware so that each of these modules will have the necessary protocols for publishing frames and/or subscribing to frames on the CAN network. It is useful to note that a data unit transmitted by a module in the CAN network is defined as a frame and two important fields in a CAN's frame are the frame's 'Identifier' field and its 'Data' field. The CAN frame's identifier field, which sets out the frame's CAN Identity or CAN ID, is used to define the message type of the frame while the Data field contains the frame's actual payload. For example, a frame's CAN ID may indicate a vehicle's parameter such as 'driving speed', 'fuel pressure', 'engine rotation speed', etc.

It should also be noted that a CAN frame does not specify its recipient's identity nor does it specify its sender's identity. Instead, CAN communication adopts a publish-subscribe messaging pattern whereby published messages are characterized based on the message's identifier. This means that only subscribers having an appropriate filter containing the message's identifier will be able to subscribe to the message and as such, receive and read the message. Due to such a messaging pattern, publishers of the messages will not be aware of subscribers that will receive their published messages.

As such, the types of frames that may be received by a module on the CAN network are determined by the module's filter. This publish-subscribe messaging pattern is best described with reference to FIG. 1. If it is assumed that module 105 is configured to broadcast a frame having a CAN identity 'B', this means that only module 107 will be able to receive the frame having the CAN identity 'B' as module 107 is provided with a filter for CAN-identity 'B'. As module 106 is provided with a filter for CAN-identity 'A', module 106 will filter out all frames that do not contain the CAN-identity 'A' including the frame transmitted by module 105.

Another node in the CAN network is gateway module 130 that comprises a computer server that is connected to the CAN network through CAN bus 110. In particular, gateway module 130 is typically provided within a vehicle and is utilized to manage and/or generate keys for nodes in the CAN network in accordance with embodiments of the invention. The detailed workings of this gateway module will be described in greater detail in the subsequent sections.

Figure 2:
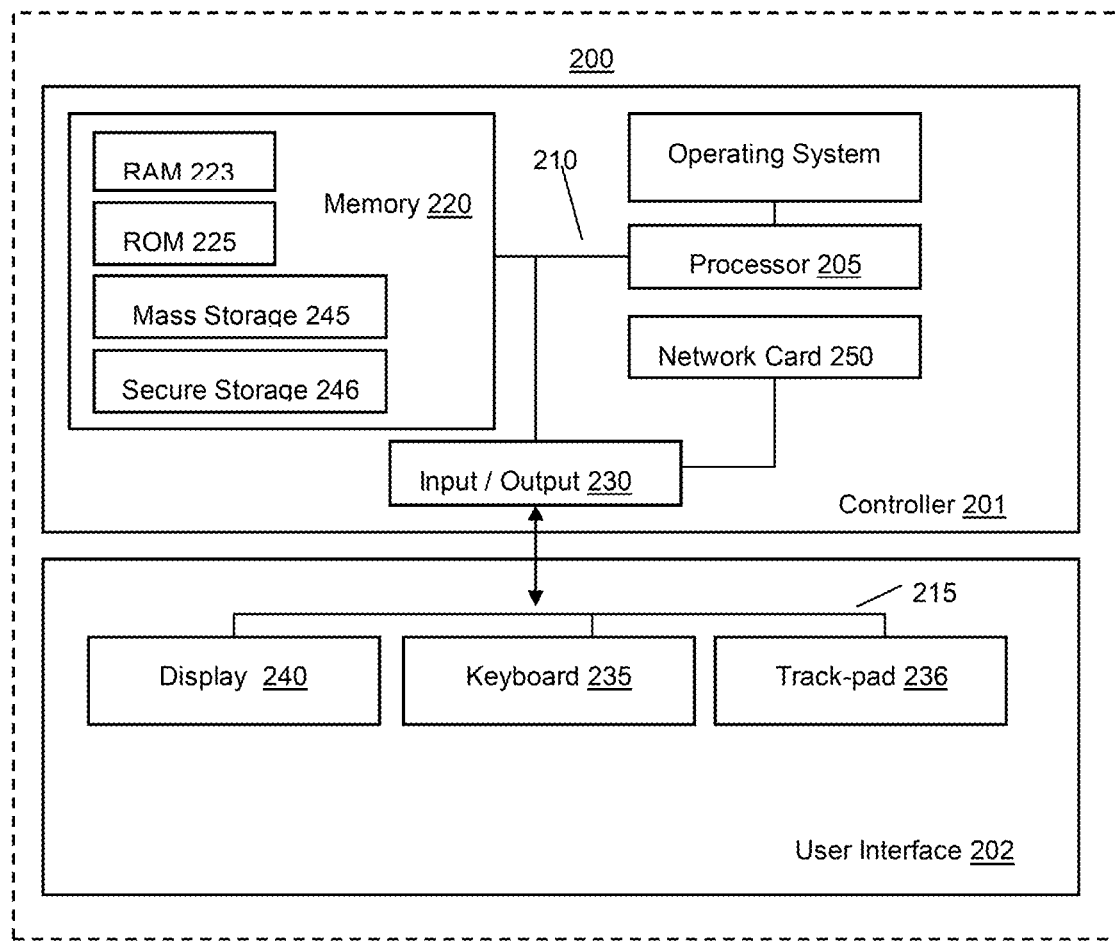
FIG. 2 illustrates a block diagram representative of components in an electronic device or module, in accordance with embodiments.

FIG. 2 illustrates a block diagram representative of components of an electronic device 200 that is provided within modules 105-107, in accordance with embodiments of the disclosure. These components may also be provided in gateway module 130. One skilled in the art will recognize that the exact configuration of each electronic device provided within each module or controller may be different and the exact configuration of electronic device 200 may vary and that the layout and configuration of FIG. 2 is provided by way of example only.

In embodiments of the disclosure, device 200 comprises controller 201 and optionally user interface 202. If user interface 202 is provided, user interface 202 is arranged to enable manual interactions between a user and electronic device 200 and for this purpose includes the input/output components required for the user to enter instructions to control electronic device 200. A person skilled in the art will recognize that components of user interface 202 may vary from embodiment to embodiment but will typically include one or more of display 240, keyboard 235, and track-pad 236.

Controller 201 is in data communication with user interface 202 via bus 215 and includes memory 220, Central Processor (CPU) 205 mounted on a circuit board that processes instructions and data for performing the method of this embodiment, an operating system 206, an input/output (I/O) interface 230 for communicating with user interface 202, and a communications interface, in this embodiment in the form of a network card 250. Network card 250 may, for example, be utilized to send data from electronic device 200 via a wired or wireless network to other processing devices or to receive data via the wired or wireless network. Wireless networks that may be utilized by network card 250 include, but are not limited to, Wireless-Fidelity (Wi-Fi), Bluetooth, Near Field Communication (NFC), cellular networks, satellite networks, telecommunication networks, Wide Area Networks (WAN), etc.

Memory 220 and operating system 206 are in data communication with CPU 205 via bus 210. The memory components include both volatile and non-volatile memory and more than one of each type of memory, including Random Access Memory (RAM) 220, Read Only Memory (ROM) 225 and a mass storage device 245, the last comprising one or more solid-state drives (SSDs). Memory 220 also includes secure storage 246 for securely storing private cryptographic keys such as root keys and/or private keys. It should be noted that the contents within secure storage 246 are only accessible by a super-user or administrator of device 200 and may not be accessed by any simple user of device 200. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 220 may include a kernel and/or programming modules such as a software application that may be stored in either volatile or non-volatile memory.

It should be noted that the term "CPU" is used to refer generically to any device or component that can process such instructions and may include: a microprocessor, microcontroller, programmable logic device or other computational device. That is, CPU 205 may be provided by any suitable logic circuitry for receiving inputs, processing them in accordance with instructions stored in memory and generating outputs (for example to the memory components or on display 240). In this embodiment, CPU 205 may be a single core or multi-core processor with memory addressable space. In one example, CPU 205 may be multi-core, comprising—for example—an 8 core CPU.

Figure 3:
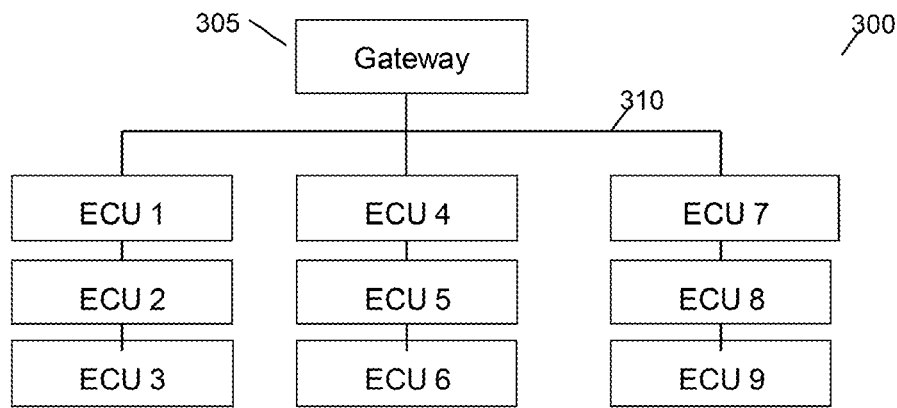
FIG. 3 illustrates a block diagram representative of modules contained in an in-vehicle system, in accordance with embodiments, whereby the modules are grouped according to their functionalities.

FIG. 3 illustrates an example of modules contained in an in-vehicle system that utilizes the CAN network to communicate with one another in accordance with embodiments of the disclosure. Although FIG. 3 only illustrates electronic control units (ECUs), one skilled in the art will recognize that in-vehicle system 300 may also include various types of I/O devices and that other types of modules may be used in place of the ECUs as long as the devices and modules have the required protocols for communicating on the CAN network.

In embodiments of the invention, ECU 1 may represent a transmission control ECU, ECU 2 may represent a powertrain control ECU, and ECU 3 may represent an engine control ECU. As all these ECUs relate to the vehicle's power, these types of ECUs may be grouped together by gateway 305 under a subgroup relating to the vehicle's power. Similarly, in embodiments of the disclosure, ECU 4 may represent a steering control ECU, ECU 5 may represent an airbag control ECU, and ECU 6 may represent a brake system control ECU. As all these ECUs relate to the vehicle's chassis control, these types of ECUs may be grouped together by gateway 305 under a subgroup relating to the vehicle's chassis. As for the last group of ECUs, ECU 7 may represent a seat control ECU, ECU 8 may represent a door control ECU, and ECU 9 may represent a heating, ventilation, and air-conditioning system ECU. As all these ECUs relate to the vehicle's body, these types of ECUs may be grouped together by gateway 305 under a subgroup relating to the vehicle's body. In summary, one skilled in the art will recognize that in-vehicle system 300 may comprise other modules/ECUs and these modules may be grouped in various combinations based on the respective functionalities of the modules in the system.

In-vehicle system 300 also includes gateway 305 that is configured to control and manage the plurality of ECUs (e.g. ECU 1 to ECU 9) through bus 310. Gateway 305 achieves this by managing the generation and distribution of authentication keys for each of the nodes in the CAN network of in-vehicle system 300. As such, gateway 305 usually comprises a secure server that is only accessible by the vehicle's trusted users or an administrator appointed by the vehicle's owner.

In particular, gateway 305 generates authentication keys for all the CAN-IDs in the CAN network in the following manner. Gateway 305 will first organize all the CAN-IDs in the CAN network into various subsets, e.g., based on the functionalities of the CAN-IDs. For example, CAN-IDs that relate to the automatic start/stop function such as speed sensor, steering angle, engine speed and engine fan speed will all be grouped together into a first subset, CAN-IDs that relate to the parking assist function such as parking sensor and side door mirror motor will all be grouped together into a second subset and CAN-IDs sensors that relate to the braking function such as road speed sensor, seat belt sensor and tilt sensor will all be grouped together into a third subset. Gateway 305 then arranges each of the subsets as tree structures whereby each tree structure has a root node which represents the function of the CAN-IDs in the subset. An exemplary tree structure is illustrated in FIG. 4.

Figure 4:
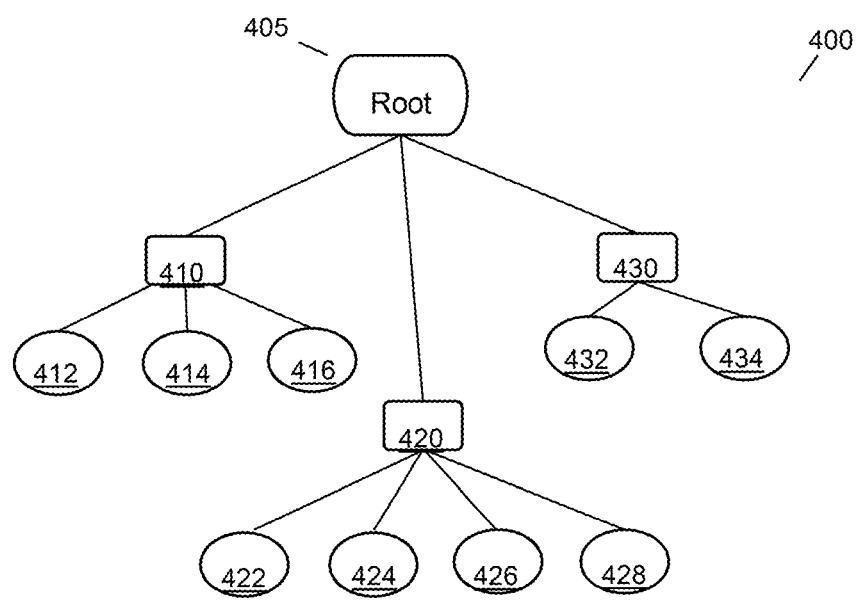
FIG. 4 illustrates a block diagram of a tree structure, in accordance with embodiments, whereby subsets of CAN identities have been grouped in the tree structure according to their functionalities.

With reference to FIG. 4 and based on the example above, the first subset may be represented by the tree structure comprising tree nodes 420, 422, 424, 426 and 428 (i.e. one root node and four nodes that represent the CAN-IDs). As node 420 is the root node of this tree structure (i.e. the first subset), node 420 represents the automatic start/stop function, which is the function of the first subset. As for the remaining nodes 422, 424, 426 and 428, each of these nodes may then be used to represent a CAN-ID from the first subset. For example, node 422 may represent the CAN-ID 'speed sensor', node 424 may represent the CAN-ID 'steering angle', node 426 may represent the CAN-ID 'engine speed' and node 428 may represent the CAN-ID 'engine fan speed'.

Similarly, if the second and third subsets were to be converted into their respective tree structures, this would result in the second subset being represented by the tree structure comprising tree nodes 430, 432 and 434 while the third subset would be represented by the tree structure comprising tree nodes 410, 412, 414 and 416. As node 430 is the root node of its tree structure (i.e. the second subset), node 430 represents the parking assist function, which is the function of the second subset. The remaining nodes 432 and 434 are then used to represent the respective CAN-IDs in the second subset. Similarly, as node 410 is the root node of its tree structure (i.e. the third subset), node 410 represents the braking function, which is the function of the third subset. The remaining nodes 412, 414 and 416 are then used to represent the respective CAN-IDs in the third subset.

Gateway 305 will then arrange these sub-sets into a single unified tree structure 400 whereby the root nodes associated with each of the CAN-ID subsets will be directly connected to root node 405. The connection of the nodes is such that the root nodes of these subsets and their respective CAN-IDs will be treated as descendant nodes of root node 405. In general, descendant nodes refer to nodes that reside at lower levels of tree structure 400, e.g. child nodes, grandchild nodes, etc. In such a configuration, nodes 410, 420 and 430 are considered as child nodes of root node 405 while nodes 412, 414 and 416 are considered as child nodes of node 410, nodes 422, 424, 426 and 428 are considered as child nodes of node 420 and nodes 432 and 434 are considered as child nodes of node 430. Conversely, root node 405 may be considered as the ascendant node of the leaf nodes 412-416, 422-428 and 432, 434 as root node 405 resides at higher levels of tree structure 400 as compared to these leaf nodes.

Once tree structure 400 has been generated, gateway 305 then sets a root key, $N_R$, for root node 405. Gateway 305 will then compute keys for each node in tree structure 400, starting from child nodes of root node 405, wherein a key of a child node in the tree structure is computed using a key of a parent node and an identifier identifying the child node. For example, when gateway 305 computes a key for node 410, gateway 305 will utilize the key of node 410's parent node, which is root key $N_R$, and the identifier for node 410.

In embodiments of the invention, identifiers for nodes associated with a CAN-ID will be the CAN-ID itself while identifiers for each subset's root node (i.e. nodes 410, 420, 430) may comprise the root-node path's alphanumeric identifier or any other type or form of alphanumeric identifiers that may be used to identify each subset's root node. A root-node path's alphanumeric identifier refers to a value that has been assigned to a particular node when the path is tracked from root 405. For example, for subset root node 410, this node may be assigned a root-node path alphanumeric identifier having a value '0', while subset root node 420 may be assigned a different root-node path alphanumeric identifier having a value '1' and subset root node 430 may be assigned yet another root-node path alphanumeric identifier having a value '3'.

Returning to the example above, this means that when gateway 305 computes a key for node 410, gateway 305 will utilize the key of node 410's parent node, which is root key $N_R$, and the identifier for node 410, which is the value '0' (under the assumption that this subset's root node comprises a root-node path alphanumeric identifier value of '0') to compute the key $k_{410}$ for node 410.

In embodiments of the disclosure, a key for each node in tree structure 400 may be computed using the following equation:

$$key_{node} = KGF(k_{parent}, \text{alphanumeric identifier})$$

where $key_{node}$ represents a key of a node, KGF is defined as a key generating function, $k_{parent}$ is defined as the key belonging to a parent node of the node, and alphanumeric identifier is defined as the alphanumeric identifier that is used to identify the node. In embodiments of the disclosure, the key generating function may comprise a key derivation function, h( ).

Hence, in accordance with the embodiments above, the key $k_{410}$ for node 410 may be defined as $k_{410} = h(N_R, 0)$. Similarly, if the equation above is applied to obtain the key for node 412 (which is associated with a CAN-ID), a key $k_{412}$ for node 412 may be obtained as $k_{412} = h(k_{410}, \text{CAN-ID}_{412})$ where $\text{CAN-ID}_{412}$ refers to the CAN-ID related to this node, e.g. tilt sensor.

As such, it can be said that when gateway 305 is provided with the root key $N_R$, together with the identifiers of the ascendant nodes of node 412, gateway 305 would be able to compute the key $k_{412}$ for node 412. It should be noted that given the key of a node, no other node (except gateway 305) is able to compute the key of its parent node.

In another embodiment of the disclosure, once tree structure 400 has been generated using the subsets and the subsets' root nodes, gateway 305 will then selectively insert intermediate nodes between the root node of the overall tree and some of the root nodes of the subsets such that these intermediate nodes reside between the root node of the overall tree structure and the root nodes of the subsets. This represents the more general case of the tree structures and this embodiment is illustrated in FIG. 5.

Figure 5:
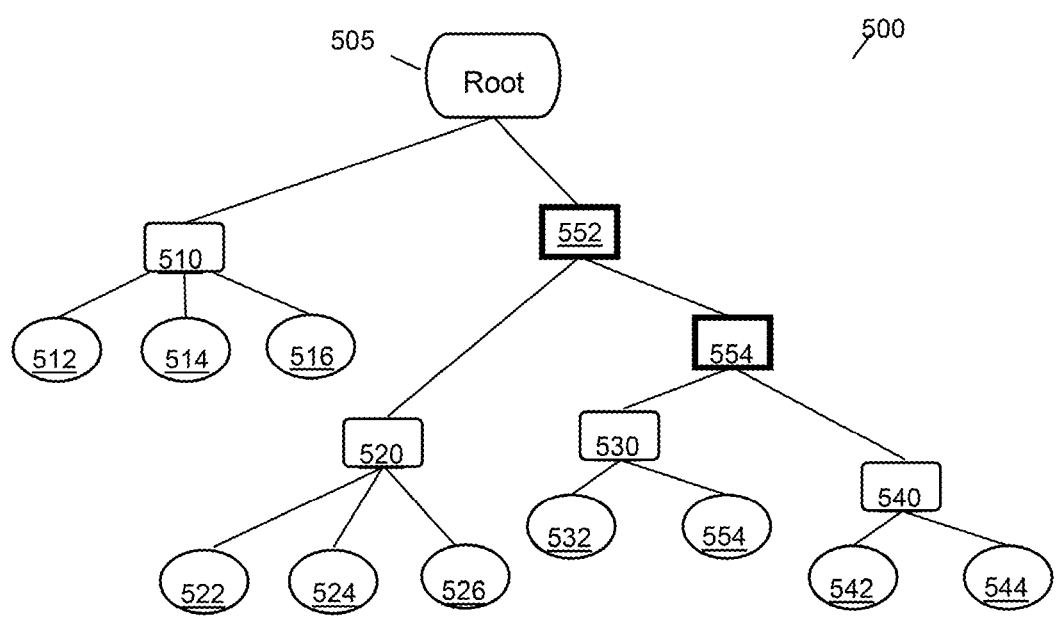
FIG. 5 illustrates a block diagram of a tree structure, in accordance with embodiments, whereby subsets of CAN identities have been grouped in the tree structure according to their functionalities and intermediate nodes have been inserted between the roots of these subsets and the tree structure's root node.

The tree structure illustrated in FIG. 5 is similar to that illustrated in FIG. 4 with the addition of intermediate nodes 552 and 554. In other words, the leaf nodes of tree structure 500 represent the CAN-IDs of the CAN network, while the nodes 510, 520, 530 and 540 represent the root nodes of each of their respective subsets.

Once tree structure 500 has been generated and selectively populated with the intermediate nodes, gateway 305 then sets a root key, $N_R$, for root node 505. Gateway 305 will then compute keys for each node in tree structure 500, starting from child nodes of root node 505, wherein a key of a child node in the tree structure is computed using a key of a parent node and an identifier identifying the child node. For example, when gateway 305 computes a key for intermediate node 552, gateway 305 will utilize the key of node 552's parent node, which is root key $N_R$, and the identifier for node 552 to compute key $k_{552}$.

In embodiments of the disclosure, identifiers for intermediate nodes (i.e. nodes 552, 554) may comprise the root-node path's alphanumeric identifier or any other type or form of alphanumeric identifiers that may be used to identify each intermediate node. A root-node path's alphanumeric identifier refers to a value that has been assigned to a particular node when the path is tracked from root 505. For example, for subset root node 510, this node may be assigned a root-node path alphanumeric identifier having a value '0', while intermediate node 552 may be assigned a different root-node path alphanumeric identifier having a value '1'. Further, subset root node 520 may be assigned root-node path alphanumeric identifier having a value '0', intermediate node 554 may be assigned a different root-node path alphanumeric identifier having a value '1' and so on.

Returning to the example above, for this embodiment of the disclosure, this means that when gateway 305 computes a key for intermediate node 552, gateway 305 will utilize the key of node 552's parent node, which is root key $N_R$, and the identifier for node 552, which is the value '1' (under the assumption that this intermediate node comprises a root-node path alphanumeric identifier value of '1') to compute the key $k_{552}$ for node 552.

Hence, based on the equations described in the previous embodiment, the key $k_{552}$ for node 552 may be defined as $k_{552}=h(N_R, 1)$. Similarly, if the equation above is applied to obtain the key for subset root node 520 (under the assumption that this node comprises a root-node path alphanumeric identifier value of '0'), a key $k_{520}$ for node 520 may be obtained as $k_{520}=h(k_{552}, 0)$.

Similarly, when gateway 305 is provided with the root key $N_R$, together with the identifiers of the ascendant nodes of node 544 (i.e. identifiers of nodes 540, 554, 552), gateway 305 would be able to compute the key $k_{544}$ for node 554.

Once gateway 305 has computed the keys for all the nodes in the tree structure, gateway 305 then selectively distributes the keys to modules in the CAN network. In embodiments of the disclosure, gateway 305 will distribute the keys based on the functionality of the modules in the CAN network. This ensures that each module will not be granted access to ascendant keys that are not related to the functionality of the module.

To recap, hundreds of CAN-IDs may exist in a CAN network as each CAN-ID identifies a particular function performed by a unit or device of the system. As such, if each module in the CAN network were to store authentication keys for each and every possible CAN-ID in the CAN network, this would mean that each module would be required to securely store and retrieve the authentication keys for the respective CAN-IDs. By implementing the tree structure generated by gateway 305, this means that each module in the CAN network only needs to store a selected few ascendant keys, the authorized CAN-ID and the corresponding root-node paths' alphanumeric identifiers.

Figure 6:
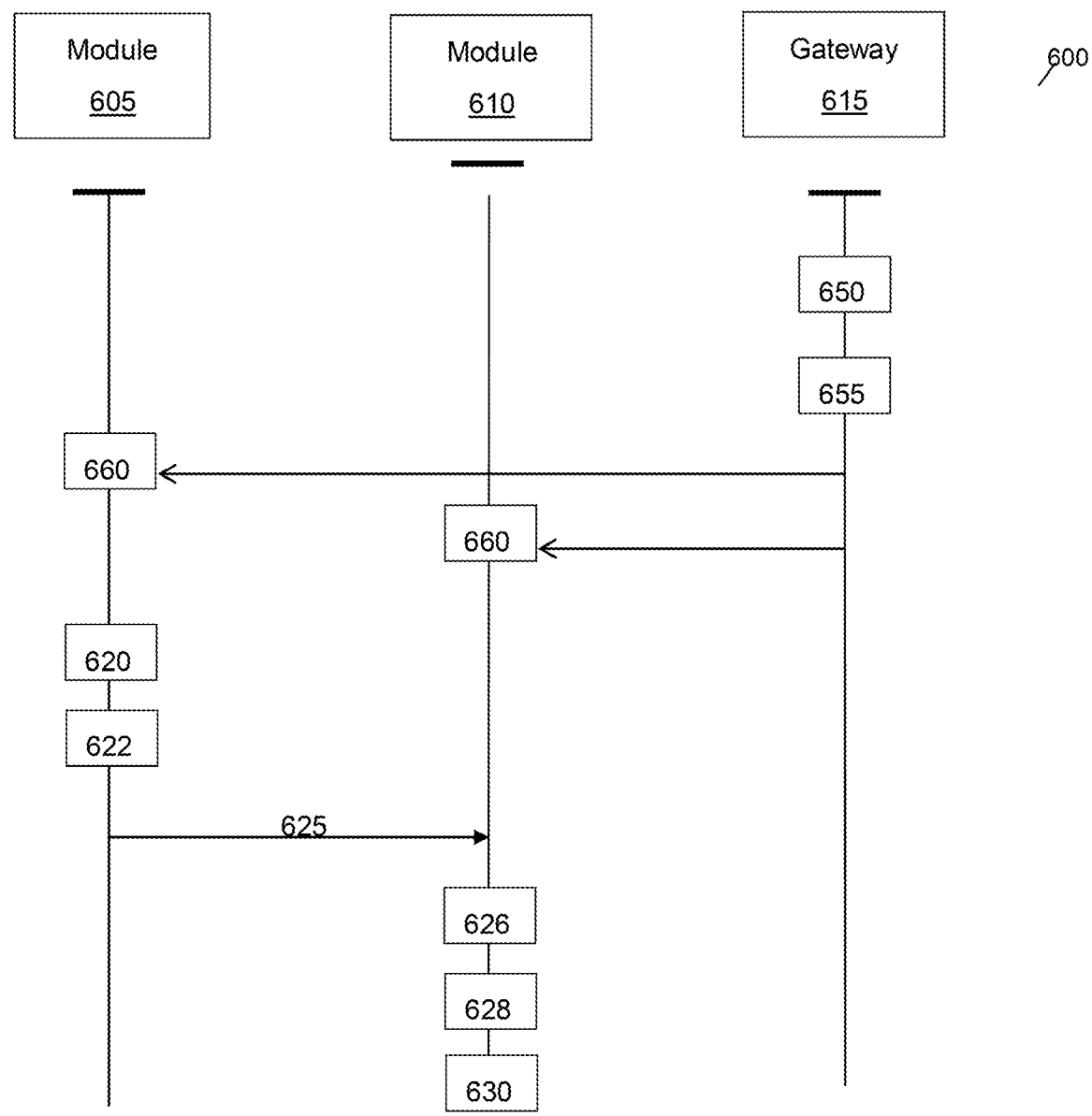
FIG. 6 illustrates a flow diagram of a process in a CAN network for authenticating messages published and received on the CAN network, in accordance with embodiments.

FIG. 6 illustrates a flow diagram of process 600 in a CAN network for authenticating messages published and received on the CAN network in accordance with embodiments of the disclosure. FIG. 6 illustrates module 605 that is configured to broadcast a CAN frame and module 610 that is configured with the appropriate filter to receive the broadcasted frame. FIG. 6 also illustrates gateway 615 that is configured to generate the hierarchical tree structure that contains all the keys for the CAN-IDs on the CAN network. It is assumed that before process 600 commences, the appropriate keys have been distributed to modules 605 and 610 by gateway 615. These keys will be allocated by gateway 615 based on the functionality or level of access granted to each relevant module. For example, if module 605 has a high level of functionality or if this module has been granted the rights to broadcast frames relating to most of the CAN-IDs in the CAN network, this means that module 605 would then be allocated with an ascendant key that is able to generate the related descendant keys for the relevant CAN-IDs.

Message Authentication Using Local Time, T

Process 600 begins with module 605 generating a frame that is to be broadcasted on the CAN network whereby the frame is associated with a CAN-ID '$id_1$'. This means that the identifier field in the frame will contain the identifier '$id_i$'. Module 605 then retrieves a key $k_{idi}$ that is associated with a CAN-ID '$id_i$'. This takes place at step 620.

In embodiments of the disclosure, the key $k_{idi}$ that was provided to module 605 may be the actual key for the CAN-ID '$id_i$'. In such an embodiment, module 605 then proceeds to step 622.

In another embodiment of the disclosure, the key that is provided to module 605 may be an ascendant key $k_{parent}$ for CAN-ID '$id_i$'. For example, with reference to the tree structure discussed above, the key $k_{parent}$ may be associated with a node that is the parent node for the node CAN-ID '$id_i$'. In this case, this means that in order to obtain the key for node CAN-ID '$id_i$', module 605 will have to utilize the key '$k_{parent}$' together with the identifier of node CAN-ID '$id_i$' to compute the key for this node.

As yet another example, the key that is provided to module 605 may be associated with a node that is the grandparent node for the node CAN-ID '$id_i$', that is $k_{grandparent}$. In this case, this means that in order to obtain the key for node CAN-ID '$id_i$', module 605 will first have to utilize the key '$k_{grandparent}$' together with an identifier of a parent node of CAN-ID '$id_i$' to compute the key '$k_{parent}$' for the parent node of CAN-ID '$id_i$'. Then, module 605 will then have to utilize the key '$k_{parent}$' together with the identifier of node CAN-ID '$id_i$' to compute the key $k_{idi}$ for the CAN-ID '$id_i$' node.

One skilled in the art will recognize that these two examples do not limit the invention in any way and that module 605 may be provided with an ascendant key located at any level of the hierarchical tree structure.

Once the appropriate key for CAN-ID '$id_i$' has been computed or retrieved, module 605 then proceeds to step 622.

At step 622, module 605 then proceeds to obtain a local time T. Module 605 then computes a verification parameter $v_d$ based on the retrieved key $k_{idi}$, the local time T, the identifier '$id_i$' of the CAN-ID and the frame that is to be broadcast on the CAN network. In particular, verification parameter $v_d$ is defined as $v_d=MAC(k_{idi}, T\|id_i\|frame)$ where MAC is a message authentication code function and $id_i$ is the identifier of the CAN-ID.

Module 605 will then broadcast the verification parameter $v_d$, the local time T and the frame to the CAN network at step 625. To recap, when a module on the CAN network broadcasts a frame, the frame will only be received by modules on the CAN network having an appropriate filter.

Under the assumption that module 610 is provided with a filter for CAN-ID 'id$_i$', this means that module 610 will be able to receive the frame broadcasted by module 605. At the same time, module 610 will also receive the verification parameter $v_d$ and the local time T broadcasted by module 605.

At step 626, module 610 will then obtain its own local time T'. Module 610 then computes the difference between its obtained local time T' and the received time T, e.g. |T'−T|, and if the difference exceeds a predetermined time window, module 610 will then discard the received information including the frame. The length of the predetermined time window is left as a design choice to the person skilled in the art.

Conversely, if the difference between T' and T are within the time window, module 610 then proceeds to retrieve a key $k_{idi}$ that is associated with a CAN-ID 'id$_i$'. This takes place at step 628. In embodiments of the invention, the key $k_{idi}$ that was provided to module 610 may be the actual key for the CAN-ID 'id$_i$'. In such an embodiment, module 610 will proceed to compute its own verification parameter $v_d$' at step 630. In another embodiment of the disclosure, the key $k_{idi}$ that was provided to module 610 may instead be an ascendant key for CAN-ID 'id$_i$'. In such an embodiment, module 610 will be required to compute the key for CAN-ID 'id$_i$' and this may be done using the steps discussed above.

Once the appropriate key $k_{idi}$, for CAN-ID 'id$_i$' has been computed or retrieved, module 610 then proceeds to step 630.

At step 630, module 610 then computes its own verification parameter $v_d$' based on the retrieved key $k_{idi}$, the received time T, the received frame and the identifier 'id$_i$' of the CAN-ID frame that was received on the CAN network. In particular, verification parameter $v_d$' is defined as $v_d$'=MAC ($k_{idi}$, T||id$_i$||frame) where MAC is a message authentication code function and id$_i$ is the identifier of the CAN-ID for the received frame. Module 610 then compares the computed verification parameter $v_d$' with the received verification parameter $v_d$ and if there is a mismatch, the received frame may be handled following the existing CAN error handling methods. Else, if the two verification parameters match, i.e. $v_d$'=$v_d$, then module 610 will proceed to process the frame as normal.

In this embodiment of the disclosure, it is important for the local time at modules 605 and 610 to be synced frequently. The syncing of the local time at these modules is done by gateway 615 and to achieve this, a dedicated CAN-ID is defined for the time synchronization process whereby only gateway 615 is granted the permission to broadcast frames having this dedicated CAN-ID identifier. As for the modules on the CAN network, it is understood that these modules will all have a filter suitable for this synchronization process so that these modules may receive the broadcast time synchronization frame from gateway 615.

In embodiments of the disclosure, the time synchronization process may take place in the following manner. Gateway 615 will first obtain its own local time T at step 650. At step 655, gateway 615 then constructs a frame with local time T as the payload of the frame with the identifier of the frame being the dedicated CAN-ID specified for this purpose.

Gateway 615 then broadcasts the frame on the CAN network. As module 610 has a filter for the CAN-ID specified for time synchronization, module 610 receives the frame at step 660. Module 610 then checks the validity of the received frame by performing a cyclic redundancy check (CRC) on the frame and if the received frame is validated, module 610 then syncs its local time using the payload contained in the frame. Step 660 also takes place at module 605 so that module 605 is too able to sync its local time to that of gateway 615. One skilled in the art will recognize that any number of modules on the CAN network may carry out step 660 to sync their respective local times with that of gateway 615 without departing from this disclosure. Error handing of the time synchronization frames will be strictly in accordance with existing CAN error handling specifications. The reason for this method is that gateway 615 is the sole entity that is authorized to broadcast time synchronization frames, thus gateway 615 is able to detect any modifications that are made to the time synchronization frames in a timely manner. If such modifications are detected by gateway 615, gateway 615 may then initiate error handing mechanisms in accordance with existing CAN specifications.

Message Authentication using a Counter, CT

In another embodiment of the disclosure, process 600 similarly begins with module 605 generating a frame associated with a CAN-ID 'id$_i$'. Module 605 then retrieves a key $k_{idi}$ that is associated with a CAN-ID 'id$_i$'. This takes place at step 620.

In embodiments of the disclosure, the key $k_{idi}$ that was provided to module 605 may be the actual key for the CAN-ID 'id$_i$'. In such an embodiment, module 605 then proceeds to step 622. In another embodiment of the disclosure, the key $k_{idi}$ that was provided to module 605 may instead be an ascendant key for CAN-ID 'id$_i$'. In such an embodiment, module 605 will be required to compute the key for CAN-ID 'id$_i$' and this may be done using the steps discussed above Once the appropriate key for CAN-ID 'id$_i$' has been computed or retrieved, module 605 then proceeds to step 622.

At step 622, module 605 then proceeds to read a current counter $CT_{idi}$ associated with CAN-ID 'id$_i$'. Module 605 then increments counter $CT_{idi}$=$CT_{idi}$+1 and computes a verification parameter $v_d$ based on the retrieved key $k_{idi}$, the counter $CT_{idi}$, the identifier 'id$_i$' of the CAN-ID and the frame that is to be broadcast on the CAN network. In particular, verification parameter $v_d$ is defined as $v_d$=MAC ($k_{idi}$, $CT_{idi}$||id$_i$||frame) where MAC is a message authentication code function and id$_i$ is the identifier of the CAN-ID.

Module 605 will then broadcast the verification parameter $v_d$ and the frame to the CAN network at step 625. To recap, when a module on the CAN network broadcasts a frame, the frame will only be received by modules on the CAN network having an appropriate filter.

Under the assumption that module 610 is provided with a filter for CAN-ID 'id$_i$', this means that module 610 will be able to receive the frame broadcasted by module 605. At the same time, module 610 will also receive the verification parameter $v_d$.

At step 626, module 610 will then obtain its own current counter $CT_{idi}$ associated with CAN-ID 'id$_i$'. Module 610 then proceeds to retrieve a key $k_{idi}$ that is associated with a CAN-ID 'id$_i$'. This takes place at step 628. In embodiments of the disclosure, the key $k_{idi}$ that was provided to module 610 may be the actual key for the CAN-ID 'id$_i$'. In such an embodiment, module 610 will proceed to compute its own verification parameter $v_d'$ at step 630. In another embodiment of the disclosure, the key $k_{idi}$ that was provided to module 610 may instead be an ascendant key for CAN-ID 'id$_i$'. In such an embodiment, module 610 will be required to compute the key for CAN-ID 'id$_i$' and this may be done using the steps discussed above.

Once the appropriate key $k_{idi}$ for CAN-ID 'id$_i$' has been computed or retrieved, module 610 then proceeds to step 630.

At step 630, module 610 then computes its own verification parameter $v_d'$ based on the retrieved key $k_{idi}$, the current counter $CT'_{idi}$, the received frame and the identifier 'id$_i$' of the CAN-ID frame that was received on the CAN network. In particular, verification parameter $v_d'$ is defined as $v_d'$=MAC ($k_{idi}$, ($CT'_{idi}$+1)$\|$id$_i\|$frame) where MAC is a message authentication code function and id$_i$ is the identifier of the CAN-ID for the received frame. Module 610 then compares the computed verification parameter $v_d'$ with the received verification parameter $v_d$ and if there is a mismatch, the received frame may be handled following the existing CAN error handling methods. Else, if the two verification parameters match, i.e. $v_d'=v_d$, then module 610 will increment its counter by 1, i.e. $CT'_{idi}=CT'_{idi}+1$ and proceed to process the frame as normal.

In this embodiment of the disclosure, it is important for the counters at modules 605 and 610 to be synced when needed, e.g., in case of failure of a CAN frame authentication. The syncing of the counters at these modules is done by gateway 615 and to achieve this, a dedicated CAN-ID is defined for the counter synchronization process whereby only gateway 615 is granted the permission to broadcast frames having this dedicated CAN-ID identifier. As for the modules on the CAN network, it is understood that these modules will all have a filter suitable for this synchronization process so that these modules may receive the broadcast frame from gateway 615.

In embodiments of the disclosure, the counter synchronization process may take place in the following manner. Gateway 615 will first obtain its own counter $CT_{idi}$ that is associated with a particular CAN-ID such as CAN-ID 'id$_i$' at step 650. At step 655, gateway 615 increments the counter as $CT_{idi}=CT_{idi}+1$, and then constructs a frame based on the incremented counter $CT_{idi}$ and CAN-ID 'id$_i$', i.e. id$_i\|CT_{idi}$ as the payload of the frame with the identifier of the frame being the dedicated CAN-ID specified for this purpose.

Gateway 615 then broadcasts the frame on the CAN network. As module 610 has a filter for the CAN-ID specified for counter synchronization, module 610 receives the frame at step 660. Module 610 then checks the validity of the received frame by performing a cyclic redundancy check (CRC) on the frame and by determining if the received counter $CT_{idi}$>the existing counter $CT'_{idi}$ and if the received frame is validated, module 610 then syncs its local counter using the payload contained in the frame. Step 660 also takes place at module 605 so that module 605 is too able to sync its local counter to that of gateway 615. One skilled in the art will recognize that any number of modules on the CAN network may carry out step 660 to sync their respective local counters with that of gateway 615 without departing from this disclosure. Error handing of the counter synchronization frames will be strictly in accordance with existing CAN error handling specifications. The reason for this method is that gateway 615 is the sole entity that is authorized to broadcast counter synchronization frames, thus gateway 615 is able to detect any modifications that are made to the counter synchronization frames in a timely manner. If such modifications are detected by gateway 615, gateway 615 may then initiate error handing mechanisms in accordance with existing CAN specifications.

Message Authentication Using a random Nonce, N

In another embodiment of the disclosure, process 600 similarly begins with module 605 generating a frame associated with a CAN-ID 'id$_i$'. Module 605 then retrieves a key $k_{idi}$ that is associated with a CAN-ID 'id$_i$'. This takes place at step 620.

In embodiments of the disclosure, the key $k_{idi}$ that was provided to module 605 may be the actual key for the CAN-ID 'id$_i$'. In such an embodiment, module 605 then proceeds to step 622. In another embodiment of the disclosure, the key $k_{idi}$ that was provided to module 605 may instead be an ascendant key for CAN-ID 'id$_i$'. In such an embodiment, module 605 will be required to compute the key for CAN-ID 'id$_i$' and this may be done using the steps discussed above Once the appropriate key for CAN-ID 'id$_i$' has been computed or retrieved, module 605 then proceeds to step 622.

At step 622, module 605 then proceeds to read a current nonce N. Module 605 then computes a verification parameter $v_d$ based on the retrieved key $k_{idi}$, the nonce N, the identifier 'id$_i$' of the CAN-ID and the frame that is to be broadcast on the CAN network. In particular, verification parameter $v_d$ is defined as $v_d$=MAC ($k_{idi}$, N$\|$id$_i\|$frame) where MAC is a message authentication code function and id$_i$ is the identifier of the CAN-ID.

Module 605 will then broadcast the verification parameter $v_d$ and the frame to the CAN network at step 625. To recap, when a module on the CAN network broadcasts a frame, the frame will only be received by modules on the CAN network having an appropriate filter.

Under the assumption that module 610 is provided with a filter for CAN-ID 'id$_i$', this means that module 610 will be able to receive the frame broadcasted by module 605. At the same time, module 610 will also receive the verification parameter $v_d$.

At step 626, module 610 will then obtain its own nonce N'. Module 610 then proceeds to retrieve a key $k_{idi}$ that is associated with a CAN-ID 'id$_i$'. This takes place at step 628. In embodiments of the disclosure, the key $k_{idi}$ that was provided to module 610 may be the actual key for the CAN-ID 'id$_i$'. In such an embodiment, module 610 will proceed to compute its own verification parameter $v_d'$ at step 630. In another embodiment of the disclosure, the key kith that was provided to module 610 may instead be an ascendant key for CAN-ID 'id$_i$'. In such an embodiment, module 610 will be required to compute the key for CAN-ID 'id$_i$' and this may be done using the steps discussed above.

Once the appropriate key $k_{idi}$ for CAN-ID 'id$_i$' has been computed or retrieved, module 610 then proceeds to step 630.

At step 630, module 610 then computes its own verification parameter $v_d'$ based on the retrieved key $k_{idi}$, the nonce N', the received frame and the identifier 'id$_i$' of the CAN-ID frame that was received on the CAN network. In particular, verification parameter $v_d'$ is defined as $v_d'$=MAC ($k_{idi}$, N'$\|$id$_i\|$frame) where MAC is a message authentication code function and id$_i$ is the identifier of the CAN-ID for the received frame. Module 610 then compares the computed verification parameter $v_d'$ with the received verification parameter $v_d$ and if there is a mismatch, the received frame may be handled following the existing CAN error handling methods. Else, if the two verification parameters match, i.e. $v_d'=v_d$, then module 610 will proceed to process the frame as normal.

In this embodiment of the invention, it is important for Gateway 615 to broadcast nonces periodically, so that modules 605 and 610 get the nonces to be used for CAN message authentication. The broadcast of nonces is done by gateway 615 only and to achieve this, a dedicated CAN-ID is defined for the nonce broadcast process whereby only gateway 615 is granted the permission to broadcast frames having this dedicated CAN-ID identifier. As for the modules on the CAN network, it is understood that these modules will all have a filter suitable for this broadcast process so that these modules may receive the broadcast frame from gateway 615.

In embodiments of the invention, the nonce broadcast process may take place in the following manner. Gateway 615 will first generate its own random nonce N at step 650. At step 655, gateway 615 then constructs a frame using nonce N as the payload of the frame with the identifier of the frame being the dedicated CAN-ID specified for this purpose.

Gateway 615 then broadcasts the frame on the CAN network. As module 610 has a filter for the CAN-ID specified for nonce synchronization, module 610 receives the frame at step 660. Module 610 then checks the validity of the received frame by performing a cyclic redundancy check (CRC) on the frame and if the received frame is validated, module 610 then syncs its local nonce using the payload contained in the frame. Step 660 also takes place at module 605 so that module 605 is too able to sync its local nonce to that of gateway 615. One skilled in the art will recognize that any number of modules on the CAN network may carry out step 660 to sync their respective nonce with that of gateway 615 without departing from this disclosure. Error handing of the nonce broadcast frames will be strictly in accordance with existing CAN error handling specifications. The reason for this method is that gateway 615 is the sole entity that is authorized to broadcast nonce synchronization frames, thus gateway 615 is able to detect any modifications that are made to the nonce synchronization frames in a timely manner. If such modifications are detected by gateway 615, gateway 615 may then initiate error handing mechanisms in accordance with existing CAN specifications.

Message Authentication Using a Local Time, T and a Counter, CT

In another embodiment of the disclosure, process 600 similarly begins with module 605 generating a frame associated with a CAN-ID 'id$_i$'. Module 605 then retrieves a key k$_{idi}$ that is associated with a CAN-ID 'id$_i$'. This takes place at step 620.

In embodiments of the disclosure, the key k$_{idi}$ that was provided to module 605 may be the actual key for the CAN-ID 'id$_i$'. In such an embodiment, module 605 then proceeds to step 622. In another embodiment of the disclosure, the key that was provided to module 605 may instead be an ascendant key for CAN-ID 'id$_i$'. In such an embodiment, module 605 will be required to compute the key for CAN-ID 'id$_i$' and this may be done using the steps discussed above Once the appropriate key for CAN-ID 'id$_i$' has been computed or retrieved, module 605 then proceeds to step 622.

At step 622, module 605 then proceeds to read a current counter CT$_{idi}$ associated with CAN-ID 'id$_i$' and obtains a local time T. Module 605 then increments counter as CT$_{idi}$=CT$_{idi}$+1 and computes a verification parameter v$_d$ based on the retrieved key k$_{idi}$, the counter CT$_{idi}$, the local time T, the identifier 'id$_i$' of the CAN-ID and the frame that is to be broadcast on the CAN network. In particular, verification parameter v$_d$ is defined as v$_d$=MAC (k$_{idi}$, T∥CT$_{idi}$∥id$_i$∥frame) where MAC is a message authentication code function and id$_i$ is the identifier of the CAN-ID.

Module 605 will then broadcast the verification parameter v$_d$, the local time T and the frame to the CAN network at step 625. To recap, when a module on the CAN network broadcasts a frame, the frame will only be received by modules on the CAN network having an appropriate filter.

Under the assumption that module 610 is provided with a filter for CAN-ID 'id$_i$', this means that module 610 will be able to receive the frame broadcasted by module 605. At the same time, module 610 will also receive the verification parameter v$_d$.

At step 626, module 610 will then obtain its own current counter CT'$_{idi}$ associated with CAN-ID 'id$_i$' and its own local time T'. Module 610 then computes the difference between its obtained local time T' and the received time T, e.g. |T'−T|, and if the difference exceeds a predetermined time window, module 610 will then discard the received information including the frame. The length of the predetermined time window is left as a design choice to the person skilled in the art.

Module 610 then proceeds to retrieve a key k$_{idi}$ that is associated with a CAN-ID 'id$_i$'. This takes place at step 628. In embodiments of the disclosure, the key k$_{idi}$ that was provided to module 610 may be the actual key for the CAN-ID 'id$_i$'. In such an embodiment, module 610 will proceed to compute its own verification parameter v$_d$' at step 630. In another embodiment of the disclosure, the key that was provided to module 610 may instead be an ascendant key for CAN-ID 'id$_i$'. In such an embodiment, module 610 will be required to compute the key for CAN-ID 'id$_i$' and this may be done using the steps discussed above.

Once the appropriate key k$_{idi}$ for CAN-ID 'id$_i$' has been computed or retrieved, module 610 then proceeds to step 630.

At step 630, module 610 then computes its own verification parameter v$_d$' based on the retrieved key k$_{idi}$, the current counter CT'$_{idi}$, the received local time T, the received frame and the identifier 'id$_i$' of the CAN-ID frame that was received on the CAN network. In particular, verification parameter v$_d$' is defined as v$_d$'=MAC (k$_{idi}$, T∥(CT'$_{idi}$+1)∥id$_i$∥frame) where MAC is a message authentication code function and ids is the identifier of the CAN-ID for the received frame. Module 610 then compares the computed verification parameter v$_d$' with the received verification parameter v$_d$ and if there is a mismatch, the received frame may be handled following the existing CAN error handling methods. Else, if the two verification parameters match, i.e. v$_d$'=v$_d$, then module 610 will increment its counter CT'$_{idi}$=CT'$_{idi}$+1 and proceed to process the frame as normal.

In this embodiment of the disclosure, it is important for the counters at modules 605 and 610 to be synced if needed e.g., in case of failure of a CAN frame authentication. The syncing of the counters at these modules is done by gateway 615 and this is done using the counter synchronization process described in previous sections.

Similarly, in this embodiment of the disclosure, it is important for the local time at modules 605 and 610 to be synced. The syncing of the local time at these modules is done by gateway 615 and this is done using the local time synchronization process described in previous sections.

Note that in this embodiment, timestamps and time synchronization could be coarse-grained and the counter could be reset to be zero for each time window.

Message Authentication Using a random Nonce, N and a Counter, CT

In another embodiment of the disclosure, process 600 similarly begins with module 605 generating a frame associated with a CAN-ID 'id$_i$'. Module 605 then retrieves a key k$_{idi}$ that is associated with a CAN-ID 'id$_i$'. This takes place at step 620.

In embodiments of the disclosure, the key k$_{idi}$ that was provided to module 605 may be the actual key for the CAN-ID 'id$_i$'. In such an embodiment, module 605 then proceeds to step 622. In another embodiment of the disclosure, the key that was provided to module 605 may instead be an ascendant key for CAN-ID 'id$_i$' (e.g. k$_{parent}$ or k$_{grandparent}$). In such an embodiment, module 605 will be required to compute the key for CAN-ID 'id$_i$' and this may be done using the steps discussed above Once the appropriate key for CAN-ID 'id$_i$' has been computed or retrieved, module 605 then proceeds to step 622.

At step 622, module 605 then proceeds to read a current counter CT$_{idi}$ associated with CAN-ID 'id$_i$' and retrieves its nonce N. Module 605 then increments counter CT$_{idi}$=CT$_{idi}$+1 and computes a verification parameter v$_d$ based on the retrieved key k$_{idi}$, the counter CT$_{idi}$, the nonce N, the identifier 'id$_i$' of the CAN-ID and the frame that is to be broadcast on the CAN network. In particular, verification parameter v$_d$ is defined as v$_d$=MAC (k$_{idi}$, N||CT$_{idi}$||id$_i$||frame) where MAC is a message authentication code function and id$_i$ is the identifier of the CAN-ID.

Module 605 will then broadcast the verification parameter v$_d$, and the frame to the CAN network at step 625. To recap, when a module on the CAN network broadcasts a frame, the frame will only be received by modules on the CAN network having an appropriate filter.

Under the assumption that module 610 is provided with a filter for CAN-ID 'id$_i$', this means that module 610 will be able to receive the frame broadcasted by module 605. At the same time, module 610 will also receive the verification parameter v$_d$.

At step 626, module 610 will then obtain its own current counter CT$_{idi}$ associated with CAN-ID 'id$_i$' and its own nonce N'. Module 610 then proceeds to retrieve a key k$_{idi}$ that is associated with a CAN-ID 'id$_i$'. This takes place at step 628. In embodiments of the disclosure, the key k$_{idi}$ that was provided to module 610 may be the actual key for the CAN-ID 'id$_i$'. In such an embodiment, module 610 will proceed to compute its own verification parameter v$_d$' at step 630. In another embodiment of the disclosure, the key that was provided to module 610 may instead be an ascendant key for CAN-ID 'id$_i$'. In such an embodiment, module 610 will be required to compute the key for CAN-ID 'id$_i$' and this may be done using the steps discussed above.

Once the appropriate key k$_{idi}$, for CAN-ID 'id$_i$' has been computed or retrieved, module 610 then proceeds to step 630.

At step 630, module 610 then computes its own verification parameter v$_d$' based on the retrieved key k$_{idi}$, the current counter CT'$_{idi}$, the nonce N', the received frame and the identifier 'id$_i$' of the CAN-ID frame that was received on the CAN network. In particular, verification parameter v$_d$' is defined as v$_d$'=MAC (k$_{idi}$, N'||(CT'$_{idi}$+1)||id$_i$|| frame) where MAC is a message authentication code function and id$_i$ is the identifier of the CAN-ID for the received frame. Module 610 then compares the computed verification parameter v$_d$' with the received verification parameter v$_d$ and if there is a mismatch, the received frame may be handled following the existing CAN error handling methods. Else, if the two verification parameters match, i.e. v$_d$'=v$_d$, then module 610 will increment its counter CT'$_{idi}$=CT'$_{idi}$+1 and proceed to process the frame as normal.

In this embodiment of the disclosure, it is important for the counters at modules 605 and 610 to be synced if needed, e.g., in case of failure of a CAN frame authentication. The syncing of the counters at these modules is done by gateway 615 and this is done using the counter synchronization process described in previous sections.

Similarly, in this embodiment of the disclosure, it is important for gateway 615 to broadcast nonces periodically, and for modules 605 and 610 to periodically receive the nonces. The broadcast of random nonces is done by gateway 615 only and this is done using the nonce broadcast process described in previous sections.

Note that in this embodiment, the periodic broadcast of random nonces by gateway could be in larger time intervals, and the counter could be reset to be zero for each time interval.

The above is a description of embodiments of a system and process in accordance with the present disclosure as set forth in the following claims. It is envisioned that others may and will design alternatives that fall within the scope of the following claims.

What is claimed is:

1. A system for managing secure communications between modules in a Controller Area Network (CAN) comprising:
   a key management module configured to:
      organize CAN identities of the CAN into sub-sets based on functionalities of the CAN identities, wherein each sub-set is arranged as a tree structure having a root node which represents a function of the sub-set,
      arrange the sub-sets of CAN identities into a tree structure having a root node N$_R$, wherein the root nodes of the sub-sets are arranged as descendant nodes of root node N$_R$, and
      set a key for the root node N$_R$ and compute keys for each node in each level in the tree structure, starting from child nodes of the root node N$_R$, wherein a key of a child node in the tree structure is computed using a key of a parent node and an identifier identifying the child node; and
   a broadcast module communicatively connected to the key management module, configured to:
      generate a frame to be transmitted on the CAN, wherein the frame is associated with a CAN identity id$_{c1}$ selected from the CAN identities,
      compute a CAN identity key k$_{c1}$ using an ascendant key k$_1$ associated with an ascendant node of the CAN identity id$_{c1}$ node and a root-node path identifier associated with the CAN identity id$_{c1}$ node, wherein the ascendant key k$_1$ is retrieved from the key management module and the root-node path identifier comprises a value assigned to the CAN identity id$_{c1}$ node,
      obtain a scheme parameter p and compute a verification parameter v$_d$ based on the scheme parameter p, the CAN identity key k$_{c1}$, the CAN identity id$_{c1}$, and the frame to be transmitted, wherein the scheme parameter p comprises a variable unique to the scheme, and
      broadcast information comprising the frame associated with the CAN identity id$_{c1}$ and the verification parameter v$_d$ on the CAN such that a receiver module on the CAN having a filter that comprises the CAN identity $id_{c1}$ receives the broadcasted information and validates the received frame using the received verification parameter $v_d$.

2. The system according to claim 1, wherein the computing the keys for each node in each level in the tree structure comprises the key management module being configured to:
for each child node in the tree structure,
compute a key $k_c$ for the child node in the tree structure using a key generating function (KGF( )), a key $k_p$ of a parent node of the child node and an identifier identifying the child node $id_c$, the key $k_c$ being defined as $k_c$=KGF($k_p$, $id_c$).

3. The system according to claim 1, wherein the computing the CAN identity key $k_{c1}$ using the ascendant key $k_1$ associated with the ascendant node of the CAN identity $id_{c1}$ node and the root-node path identifier associated with the CAN identity $id_{c1}$ node comprises the broadcast module being configured to:
compute the CAN identity key $k_{c1}$ using a key generating function (KGF( )), the CAN identity $id_{c1}$ and the ascendant key $k_1$, the CAN identity key $k_{c1}$ being defined as $k_{c1}$=KGF($k_1$, $id_{c1}$) when the ascendant key $k_1$ is associated with a parent node of the CAN identity $id_{c1}$ node and when the root-node path identifier associated with the CAN identity $id_{c1}$ node comprises the CAN identity $id_{c1}$.

4. The system according to claim 1, wherein before the key management module sets the key for the root node $N_R$, the key management module is configured to:
selectively insert at least one intermediate node between the root node $N_R$ and a root node of one of the sub-sets such that the intermediate node represents an ascendant node of the root node of one of the sub-sets.

5. The system according to claim 1, wherein the scheme parameter p comprises a local time T, the broadcast information further comprises the scheme parameter p, and wherein the broadcast module is configured to:
compute the verification parameter $v_d$ using the local time T, wherein the verification parameter $v_d$ is defined as $v_d$=MAC($k_{c1}$, T∥$id_{c1}$∥'frame') where MAC( ) is a message authentication code function, and 'frame' is the frame to be transmitted on the CAN.

6. The system according to claim 5, wherein the validation of the received frame by the receiver module comprises the receiver module being configured to:
obtain the CAN identity key $k_{c1}$ and a receiver local time $T_R$;
perform a first validation check on the validity of the received frame based on the received local time T and the obtained receiver local time $T_R$;
perform a second validation check on the validity of the received frame by comparing the received verification parameter $v_d$ with a receiver verification parameter $v_{Rd}$ when the first validation check validates the received frame, wherein the receiver verification parameter $v_{Rd}$ is defined as $v_{Rd}$=MAC($k_{c1}$, T∥$id_{c1}$∥'frame'), where MAC( ) is a message authentication code function, and 'frame' is the frame to be transmitted on the CAN; and
processing the received frame when the second validation check validates the received frame.

7. The system according to claim 6, further comprising:
a gateway module configured to:
obtain a gateway local time $T_G$;
generate a general frame using the gateway local time $T_G$ that is transmitted and received by all the modules on the CAN such that when each module receives the general frame, wherein each module is configured to:
validate the received general frame; and
synchronize local time of the module using the gateway local time TG when the received general frame is validated.

8. The system according to claim 6, wherein the obtaining the CAN identity key $k_{c1}$ comprises the receiver module being configured to:
retrieve the CAN identity key $k_{c1}$ that is preloaded into the receiver module by the key management module.

9. The system according to claim 6, wherein the obtaining the CAN identity key $k_{c1}$ comprises the receiver module being configured to:
compute the CAN identity key $k_{c1}$ using the CAN identity $id_{c1}$ and a key of an ascendant node, wherein the key of the ascendant node is preloaded into the receiver module by the key management module.

10. The system according to claim 1, wherein the scheme parameter p comprises a counter $CT_{c1}$ associated with the CAN identity $id_{c1}$ and wherein the broadcast module is configured to:
increment the counter $CT_{c1}$ by one, compute the verification parameter $v_d$ using the counter $CT_{c1}$, wherein the verification parameter $v_d$ is defined as $v_d$=MAC($k_{c1}$, $CT_{c1}$∥$id_{c1}$∥'frame'), where MAC( ) is a message authentication code function, and 'frame' is the frame to be transmitted on the CAN.

11. The system according to claim 10, wherein the validation of the received frame by the receiver module comprises the receiver module being configured to:
obtain the CAN identity key $k_{c1}$ and a receiver counter $CT'_{c1}$ associated with the CAN identity $id_{c1}$;
perform a validation check on the validity of the received frame by comparing the received verification parameter $v_d$ with a receiver verification parameter $v_{Rd}$, wherein the receiver verification parameter $v_{Rd}$ is defined as $v_{Rd}$=MAC($k_{c1}$, ($CT'_{c1}$+1)∥$id_{c1}$∥'frame'), where MAC( ) is a message authentication code function, and 'frame' is the frame to be transmitted on the CAN; and
increment the counter $CT'_{c1}$ by one and process the received frame when the validation check validates the received frame,
wherein a gateway module is configured to synchronize the counter $CT_{c1}$ at the broadcast module and the counter $CT'_{c1}$ at the receiver module.

12. The system according to claim 11, wherein the gateway module is configured to synchronize the counter at the broadcast module and the receiver counter at the receiver module by:
obtaining the counter $CT_{c1}$ associated with the CAN identity $id_{c1}$;
generating a counter frame using the counter $CT_{c1}$ and the CAN identity $id_{c1}$; and
broadcasting the counter frame on the CAN such that when each module on the CAN having a counter receives the counter frame, wherein each module is configured to:
synchronize the counter in the module using the received counter frame.

13. The system according to claim 1, wherein the scheme parameter p comprises a nonce N, and wherein the broadcast module is configured to:
compute the verification parameter $v_d$ using the nonce N, wherein the verification parameter $v_d$ is defined as $v_d$=MAC($k_{c1}$, N∥$id_{c1}$∥'frame'), where MAC( ) is a message authentication code function, and 'frame' is the frame to be transmitted on the CAN.

14. The system according to claim 13, wherein the receiver module is configured to:
obtain the CAN identity key $k_{c1}$ and a receiver nonce N';
perform a validation check on the validity of the received frame by comparing the received verification parameter $v_d$ with a receiver verification parameter $v_{Rd}$, wherein the receiver verification parameter $v_{Rd}$ is defined as $v_{Rd}=MAC(k_{c1}, N'\|id_{c1}\|'frame')$, where MAC( ) is a message authentication code function, and 'frame' is the frame to be transmitted on the CAN; and
processing the received frame when the validation check validates the received frame,
wherein a gateway module is configured to synchronize the nonce N at the broadcast module and the nonce N' at the receiver module.

15. The system according to claim 14, wherein the gateway module is configured to periodically broadcast nonces at the broadcast module and the receiver module by:
generating the nonce N;
generating a nonce frame using the nonce N; and
broadcasting the nonce frame on the CAN such that when each module on the CAN receives the nonce frame, each module is configured to:
receive and store the nonce in the module using the received nonce frame.

16. The system according to claim 1, wherein the scheme parameter p comprises a local time T and a counter $CT_{c1}$ associated with the CAN identity $id_{c1}$, and the broadcast information further comprises the scheme parameter p, wherein the broadcast module is configured to:
increment the counter $CT_{c1}$ by one and compute the verification parameter $v_d$ using the local time T and the counter $CT_{c1}$, wherein the verification parameter $v_d$ is defined as $v_d=MAC(k_{c1}, T\|CT_{c1}\|id_{c1}\|'frame')$, where MAC( ) is a message authentication code function, and 'frame' is the frame to be transmitted on the CAN.

17. The system according to claim 16, wherein the receiver module is configured to:
obtain the CAN identity key $k_{c1}$, a receiver local time $T_R$, and a receiver counter $CT'_{c1}$ associated with the CAN identity $id_{c1}$;
perform a first validation check on the validity of the received frame based on the received local time T and the obtained receiver local time $T_R$;
perform a second validation check on the validity of the received frame by comparing the received verification parameter $v_d$ with a receiver verification parameter $v_{Rd}$, when the first validation check validates the received frame, wherein the receiver verification parameter $v_{Rd}$ is defined as $v_{Rd}=MAC(k_{c1}, T\|(CT'_{c1}+1)\|id_{c1}\|'frame')$, where MAC( ) is a message authentication code function, and 'frame' is the frame to be transmitted on the CAN; and
increment the counter $CT'_{c1}$ by one and process the received frame when the second validation check validates the received frame,
wherein a gateway module is configured to synchronize the counter $CT_{c1}$ at the broadcast module and the counter $CT'_{c1}$ at the receiver module.

18. The system according to claim 17, wherein the gateway module is further configured to:
obtain a gateway local time $T_G$;
generate a general frame using the gateway local time $T_G$ that is transmitted and received by all the modules on the CAN such that when each module receives the general frame, wherein each module is configured to:
validate the received general frame;
synchronize local time of the module using the gateway local time $T_G$ when the received general frame is validated; and
reset the counter in the module.

19. The system according to claim 17, wherein the gateway module is configured to synchronize the counter at the broadcast module and the receiver module by:
obtaining the counter $CT_{c1}$ associated with the CAN identity $id_{c1}$;
generating a counter frame using the counter $CT_{c1}$ and the CAN identity $id_{c1}$; and
broadcasting the counter frame on the CAN such that when each module on the CAN having the counter receives the counter frame, wherein each module is configured to:
synchronize the counter in the module using the received counter frame.

20. The system according to claim 1, wherein the scheme parameter p comprises a nonce N and a counter $CT_{c1}$ associated with the CAN identity $id_{c1}$, and wherein the broadcast module is configured to:
increment the counter $CT_{c1}$ by one and compute the verification parameter $v_d$ using the nonce N and the counter $CT_{c1}$, wherein the verification parameter $v_d$ is defined as $v_d=MAC(k_{c1}, N\|CT_{c1}\|id_{c1}\|'frame')$, where MAC( ) is a message authentication code function, and 'frame' is the frame to be transmitted on the CAN.

21. The system according to claim 20, wherein the receiver module is configured to:
obtain the CAN identity key $k_{c1}$, a receiver nonce N', and a receiver counter $CT'_{c1}$ associated with the CAN identity $id_{c1}$;
perform a validation check on the validity of the received frame by comparing the received verification parameter $v_d$ with a receiver verification parameter $v_{Rd}$, wherein the receiver verification parameter $v_{Rd}$ is defined as $v_{Rd}=MAC(k_{c1}, N'\|(CT'_{c1}+1)\|id_{c1}\|'frame')$, where MAC( ) is a message authentication code function, and 'frame' is the frame to be transmitted on the CAN; and
increment the counter $CT'_{c1}$ by one and process the received frame when the validation check validates the received frame,
wherein a gateway module is configured to broadcast the nonce N at the broadcast module, the nonce N' at the receiver module, and synchronize the counter $CT_{c1}$ at the broadcast module and the counter $CT'_{c1}$ at the receiver module.

22. The system according to claim 21, wherein the gateway module is configured to synchronize the counter at the broadcast module and the receiver module by:
obtaining the counter $CT_{c1}$ associated with the CAN identity $id_{c1}$;
generating a counter frame using the counter $CT_{c1}$ and the CAN identity $id_{c1}$; and
broadcasting the counter frame on the CAN such that when each module on the CAN receives the counter frame, each module is configured to:
synchronize the counter in the module using the received counter frame.

23. The system according to claim 21, wherein the gateway module is configured to periodically broadcast the nonces at the broadcast module and the receiver module by:

generating the nonce N;

generating a nonce frame using the nonce N; and broadcasting the nonce frame on the CAN such that when each module on the CAN receives the nonce frame, each module is configured to:

validate and store the nonce in the module using the received nonce frame.

24. A method for generating a hierarchical tree structure for Controller Area Network (CAN) identities in a CAN network, the method using a key management module provided in a vehicle, the method comprising:

organizing CAN identities of the CAN into sub-sets based on functionalities of the CAN identities, wherein each sub-set is arranged as a tree structure having a root node that represents a function of the sub-set;

arranging the sub-sets of CAN identities into a tree structure having a root node $N_R$, wherein the root nodes of the sub-sets are arranged as descendant nodes of root node $N_R$; and setting a key for the root node $N_R$ and computing keys for each node in each level in the tree structure, starting from child nodes of the root node $N_R$, wherein a key of a child node in the tree structure is computed using a key of a parent node and an identifier identifying the child node.

25. The method according to claim 24, wherein the computing the keys for each node in each level in the tree structure comprises:

for each child node in the tree structure, computing a key $k_c$ for the child node in the tree structure using a key generating function (KGF( )), a key of a parent node of the child node $k_p$, and an identifier identifying the child node $id_c$, the key $k_c$ being defined as $k_c=\text{KGF}(k_p, id_c)$.

26. The method according to claim 24, wherein before the setting the key for the root node $N_R$, the method comprises the step of:

selectively inserting at least one intermediate node between the root node $N_R$ and a root node of one of the sub-sets such that the intermediate node represents an ascendant node of the root node of one of the sub-sets.

* * * * *